US011091151B2

(12) United States Patent
Noguchi et al.

(10) Patent No.: US 11,091,151 B2
(45) Date of Patent: Aug. 17, 2021

(54) MANAGEMENT DEVICE, VEHICLE MANAGEMENT METHOD, PROGRAM, AND VEHICLE MANAGEMENT SYSTEM

(71) Applicant: HONDA MOTOR CO., LTD., Tokyo (JP)

(72) Inventors: Junpei Noguchi, Wako (JP); Chie Sugihara, Tokyo (JP); Yuta Takada, Tokyo (JP); Ryoma Taguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/886,847

(22) Filed: May 29, 2020

(65) Prior Publication Data

US 2020/0384983 A1    Dec. 10, 2020

(30) Foreign Application Priority Data

Jun. 10, 2019    (JP) .............................. JP2019-107926

(51) Int. Cl.
*B60W 30/06* (2006.01)
*G06K 9/00* (2006.01)
*G08G 1/14* (2006.01)

(52) U.S. Cl.
CPC ......... *B60W 30/06* (2013.01); *G06K 9/00812* (2013.01); *G08G 1/147* (2013.01)

(58) Field of Classification Search
CPC .... B60W 30/06; G06K 9/00812; G08G 1/147
See application file for complete search history.

(56) References Cited

U.S. PATENT DOCUMENTS

| 10,040,482 | B1 * | 8/2018 | Jung | B62D 15/0285 |
| 2014/0340242 | A1 * | 11/2014 | Belzner | G08G 1/143 340/932.2 |
| 2019/0019407 | A1 * | 1/2019 | Nakhjavani | G06K 9/00812 |
| 2020/0307554 | A1 * | 10/2020 | Lai | B60W 30/06 |

FOREIGN PATENT DOCUMENTS

JP    2011-209779    10/2011

* cited by examiner

*Primary Examiner* — Daryl C Pope
(74) *Attorney, Agent, or Firm* — Amin, Turocy & Watson, LLP

(57) ABSTRACT

A management device guides a vehicle capable of performing automated traveling to a target parking space with reference to management information indicating parking situations of a plurality of parking spaces. The management device includes: a communicator configured to receive parking situation information which is information generated based on a recognition result by a recognizer recognizing a surrounding situation of the vehicle, the parking situation information indicating whether another vehicle is parked in a parking space adjacent to a route along which the vehicle is traveling; and an extractor configured to extract a parking space in which a parking situation managed with the management information is different from an actual parking situation based on the received parking situation information.

7 Claims, 18 Drawing Sheets

MANAGEMENT DEVICE, VEHICLE MANAGEMENT METHOD, PROGRAM, AND VEHICLE MANAGEMENT SYSTEM

CROSS-REFERENCE TO RELATED APPLICATION

Priority is claimed on Japanese Patent Application No. 2019-107926, filed on Jun. 10, 2019, the contents of which are incorporated herein by reference.

BACKGROUND

Field of the Invention

The present invention relates to a management device, a vehicle management method, a program, and a vehicle management system.

Background

In recent years, studies of automated vehicle control have been conducted. As a technology using this control, an automated valet parking technology for communicating with an automated driving vehicle and guiding the automated driving vehicle to a vacant space in a parking lot belonging to a facility to perform automated parking is known. In the valet parking technology, a system that communicates with a plurality of vehicles, receives signals indicating that the vehicles have left a parked state from the vehicles, and manages mutual parking situations of the plurality of vehicles is known (for example, Japanese Unexamined Patent Application, First Publication No. 2011-209779).

SUMMARY

In the technology of the related art, however, when a vehicle parks at a parking position different from a designated parking position, a managed parking position may be different from an actual parking position. Therefore, when another vehicle is guided to a position which is considered to be vacant by management, another vehicle has actually parked there. Such a circumstance has not been examined sufficiently.

An objective of an aspect of the present invention is to provide a management device, a vehicle management method, a program, and a vehicle management system capable of managing parking situations of parking spaces in valet parking more accurately.

According to a first aspect of the present invention, a management device guides a vehicle capable of performing automated traveling to a target parking space with reference to management information indicating parking situations of a plurality of parking spaces. The management device includes: a communicator configured to receive parking situation information which is information generated based on a recognition result by a recognizer recognizing a surrounding situation of the vehicle, the parking situation information indicating whether another vehicle is parked in a parking space adjacent to a route along which the vehicle is traveling; and an extractor configured to extract a parking space in which a parking situation managed with the management information is different from an actual parking situation based on the received parking situation information.

According to a second aspect of the present invention, in the management device of the first aspect, the parking situation information received by the management device may be information indicating a parking situation of a parking space adjacent to the route along which the vehicle is traveling while the vehicle is traveling to the target parking space.

According to a third aspect of the present invention, the management device of the first or second aspect may further include a changer configured to change the management information regarding a parking situation of a parking space extracted by the extractor based on information received from the vehicle.

According to a fourth aspect of the present invention, the management device of any one of the first to third aspects may further include an abnormality determiner configured to determine an abnormality based on an extraction result by the extractor.

According to a fifth aspect of the present invention, in the management device of any one of the first to fourth aspects, a vehicle with higher externality detection performance may generate a guide route so that a distance to the target parking space becomes longer than that of a vehicle with lower externality detection performance.

A sixth aspect of the present invention is a vehicle management method, by way of a computer, including: guiding a vehicle capable of performing automated traveling to a target parking space with reference to management information indicating parking situations of a plurality of parking spaces; receiving parking situation information which is information generated based on a recognition result by a recognizer recognizing a surrounding situation of the vehicle, the parking situation information indicating whether another vehicle is parked in a parking space adjacent to a route along which the vehicle is traveling; and extracting a parking space in which a parking situation managed with the management information is different from an actual parking situation based on the received parking situation information.

According to a seventh aspect of the present invention, a non-transitory computer-readable recording medium is provided that includes a program causing a computer to: guide a vehicle capable of performing automated traveling to a target parking space with reference to management information indicating parking situations of a plurality of parking spaces; receive parking situation information which is information generated based on a recognition result by a recognizer recognizing a surrounding situation of the vehicle, the parking situation information indicating whether another vehicle is parked in a parking space adjacent to a route along which the vehicle is traveling; and extract a parking space in which a parking situation managed with the management information is different from an actual parking situation based on the received parking situation information.

According to an eighth aspect of the present invention, a vehicle management system includes: a management device configured to guide a vehicle capable of performing automated traveling to a target parking space with reference to management information indicating parking situations of a plurality of parking spaces; and a vehicle control device mounted in the vehicle and including a communicator that communicates with the management device and a recognizer that recognizes a surrounding situation of the vehicle. The vehicle control device further includes a generator that generates parking situation information including information indicating whether another vehicle is parked in a parking space that the vehicle passes based on a result recognized by the recognizer and causes the communicator to transmit the parking situation information to the management device. The management device further includes an extractor that extracts a parking space in which a parking situation managed with the management information is different from an actual parking situation based on the parking situation information received from the vehicle control device.

According to the first to eighth aspects of the present invention, it is possible to manage parking situations of parking spaces in valet parking more accurately.

DESCRIPTION OF EMBODIMENTS

First Embodiment

Hereinafter, embodiments of a vehicle management system, a vehicle management method, and a program according to the present invention will be described with reference to the drawings.

[Overall Configuration]

Figure 1:
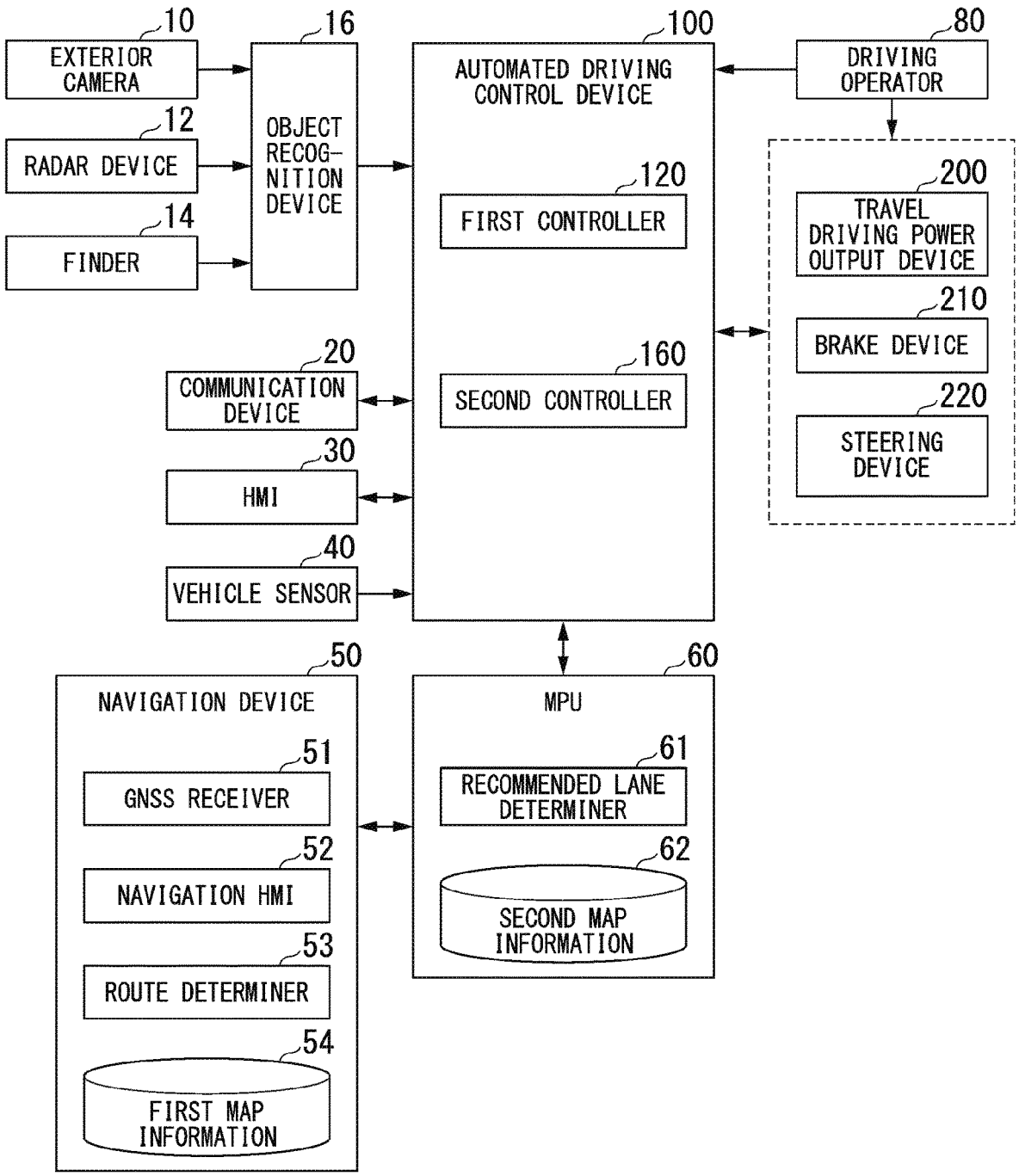
FIG. 1 is a diagram illustrating a configuration of a vehicle system in which a vehicle control device according to an embodiment is used.

FIG. 1 is a diagram showing a configuration of a vehicle system 1 in which a vehicle control device according to an embodiment is used. A vehicle in which the vehicle system 1 is mounted is, for example, a vehicle such as a two-wheeled vehicle, a three-wheeled vehicle, or a four-wheeled vehicle. A driving source of the vehicle includes an internal combustion engine such as a diesel engine or a gasoline engine, an electric motor, or a combination thereof. The electric motor operates using power generated by a power generator connected to the internal combustion engine or power discharged from a secondary cell or a fuel cell.

The vehicle system 1 includes, for example, an exterior camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving power output device 200, a brake device 210, and a steering device 220. The devices and units are connected to one another via a multiplex communication line such as a controller area network (CAN) communication line, a serial communication line, or a wireless communication network. The configuration shown in FIG. 1 is merely exemplary, and part of the configuration may be omitted or other configurations may be further added.

The exterior camera 10 is, for example, a digital camera that uses a solid-state image sensor such as a charged coupled device (CCD) or a complementary metal oxide semiconductor (CMOS). The exterior camera 10 is mounted on any portion of a vehicle in which the vehicle system 1 is mounted (hereinafter referred to as an own vehicle M). When the exterior camera 10 images a front side, the exterior camera 10 is mounted on an upper portion of a front windshield, a rear surface of a rearview mirror, or the like. For example, the exterior camera 10 repeatedly images the surroundings of the own vehicle M periodically. The exterior camera 10 may be a stereo camera or an omnidirectional camera.

The radar device 12 radiates radio waves such as millimeter waves to the surroundings of the own vehicle M and detects radio waves (reflected waves) reflected from an object to detect at least a position (a distance from and an azimuth of) of the object. The radar device 12 is mounted on any portion of the own vehicle M. The radar device 12 may detect the position and the speed of an object in conformity with a frequency modulated continuous wave (FM-CW) scheme.

The finder 14 is a light detection and ranging (LIDAR) finder. The finder 14 radiates light to the surroundings of the own vehicle M and measures scattered light. The finder 14 detects a distance to a target based on a time from light emission to light reception. The radiated light is, for example, pulsed laser light. The finder 14 is mounted on any portions of the own vehicle M.

The object recognition device 16 performs a sensor fusion process on detection results from some or all of the exterior camera 10, the radar device 12, and the finder 14 and recognizes the position, the type, the speed, and the like of an object. The object recognition device 16 outputs a recognition result to the automated driving control device 100. The object recognition device 16 may output detection results of the exterior camera 10, the radar device 12, and the finder 14 to the automated driving control device 100 without any change. The object recognition device 16 may be excluded from the vehicle system 1.

The communication device 20 communicates with another vehicle around the own vehicle M, the parking lot management device (to be described below), or various server devices by using, for example, a cellular network, a Wi-Fi network, Bluetooth (registered trademark), dedicated short range communication (DSRC) or the like.

The HMI 30 presents various types of information to occupants of the own vehicle M and receives input operations by the occupants. The HMI 30 includes various display devices, speakers, buzzers, touch panels, switches, and keys. The HMI 30 may receive an instruction from a user through a manual operation by a user or may recognize the voice of the user and receive an instruction from the user.

The vehicle sensor 40 includes a vehicle speed sensor that detects a speed of the own vehicle M, an acceleration sensor that detects acceleration, a yaw rate sensor that detects angular velocity around a vertical axis, and an azimuth sensor that detects a direction of the own vehicle M.

The navigation device 50 includes, for example, a global navigation satellite system (GNSS) receiver 51, a navigation HMI 52, and a route determiner 53. The navigation device 50 retains first map information 54 in a storage device such as a hard disk drive (HDD) or a flash memory. The GNSS receiver 51 specifies a position of the own vehicle M based on signals received from GNSS satellites. The position of the own vehicle M may be specified or complemented for by an inertial navigation system (INS) using an output of the vehicle sensor 40. The navigation HMI 52 includes a display device, a speaker, a touch panel, and a key. The navigation HMI 52 may be partially or entirely common to the above-described HMI 30. The route determiner 53 determines, for example, a route from a position of the own vehicle M specified by the GNSS receiver 51 (or any input position) to a destination input by an occupant using the navigation HMI 52 (hereinafter referred to as a route on a map) with reference to the first map information 54. The first map information 54 is, for example, information in which a road shape is expressed by links indicating roads and nodes connected by the links. The first map information 54 may include a curvature of a road and point of interest (POI) information.

The route on the map is output to the MPU 60. The navigation device 50 may perform route guidance using the navigation HMI 52 based on the route on the map. The navigation device 50 may be realized by, for example, a function of a terminal device such as a smartphone or a tablet terminal possessed by an occupant. The navigation device 50 may transmit a present position and a destination to a navigation server via the communication device 20 to acquire the same route as the route on the map from the navigation server.

The MPU 60 includes, for example, a recommended lane determiner 61 and retains second map information 62 in a storage device such as an HDD or a flash memory. The recommended lane determiner 61 divides the route on the map provided from the navigation device 50 into a plurality of blocks (for example, divides the route in a vehicle movement direction for each 100 [m]) and determines a recommended lane for each block with reference to the second map information 62. The recommended lane determiner 61 determines in which lane the vehicle travels from the left.

When there is a branching location in the route on the map, the recommended lane determiner 61 determines a recommended lane so that the own vehicle M can travel in a reasonable route to move to a branching destination.

The second map information 62 is map information that has higher precision than the first map information 54. The second map information 62 includes, for example, information regarding the middles of lanes or information regarding boundaries of lanes. The second map information 62 may include road information, traffic regulation information, address information (address and postal number), facility information, and telephone number information. The second map information 62 may be updated frequently by communicating with another device using the communication device 20.

The driving operator 80 includes, for example, an accelerator pedal, a brake pedal, a shift lever, a steering wheel, a heteromorphic steering wheel, a joystick, and other operators. A sensor that detects whether there is an operation or an operation amount is mounted in the driving operator 80 and a detection result is output to the automated driving control device 100 or some or all of the travel driving power output device 200, the brake device 210, and the steering device 220.

The automated driving control device 100 includes, for example, a first controller 120 and a second controller 160. Each of the first controller 120 and the second controller 160 is realized, for example, by causing a hardware processor such as a central processing unit (CPU) to execute a program (software). Some or all of the constituent elements may be realized by hardware (a circuit unit including circuitry) such as a large scale integration (LSI), an application specific integrated circuit (ASIC), a field-programmable gate array (FPGA), or a graphics processing unit (GPU) or may be realized by software and hardware in cooperation. The program may be stored in advance in a storage device (a storage device including a non-transitory storage medium) such as an HDD or a flash memory of the automated driving control device 100 or may be stored in a detachably mounted storage medium such as a DVD, a CD-ROM, or the like so that the storage medium (a non-transitory storage medium) is mounted on a drive device to be installed on the HDD or the flash memory of the automated driving control device 100.

Figure 2:
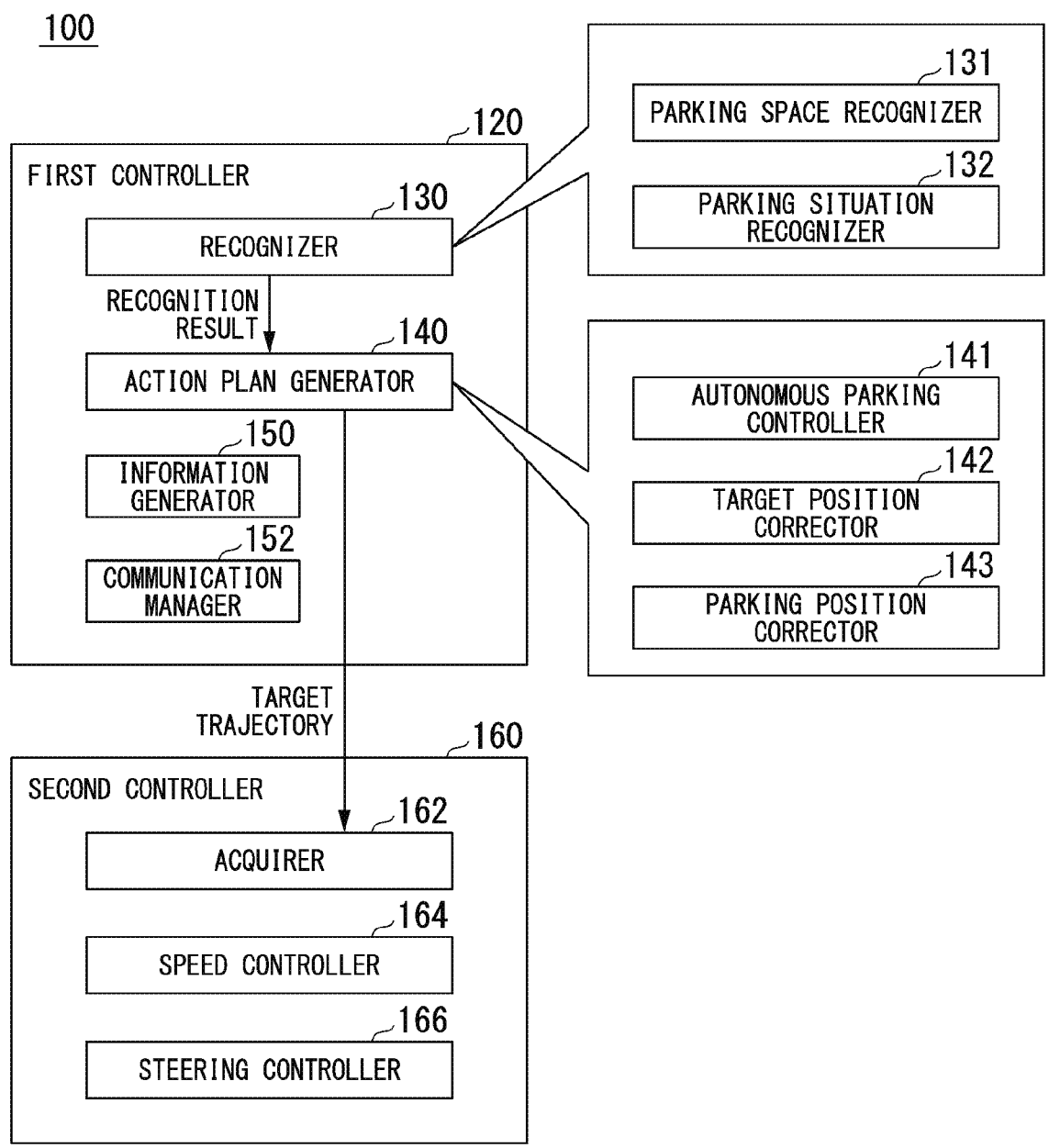
FIG. 2 is a diagram illustrating a functional configuration of a first controller and a second controller.

FIG. 2 is a diagram illustrating a functional configuration of the first controller 120 and the second controller 160. The first controller 120 includes, for example, a recognizer 130, an action plan generator 140, an information generator 150, and a communication manager 152. The first controller 120 realizes, for example, a function by artificial intelligence (AI) and a function by a model given in advance in parallel.

For example, a function of "recognizing an intersection" may be realized by performing recognition of an intersection by deep learning or the like and recognition based on a condition given in advance (a signal, a road sign, or the like which can be subjected to pattern matching) in parallel, scoring both the recognitions, and performing evaluation comprehensively. Thus, reliability of automated driving is guaranteed.

The recognizer 130 recognizes states such as a position, a speed, acceleration, or the like of an object near the own vehicle M based on information input from the exterior camera 10, the radar device 12, and the finder 14 via the object recognition device 16. For example, the position of the object is recognized as a position on the absolute coordinates in which a representative point (a center of gravity, a center of a driving shaft, or the like) of the own vehicle M is the origin and is used for control. The position of the object may be represented as a representative point such as a center of gravity, a corner, or the like of the object or may be represented as expressed regions. A "state" of an object may include acceleration or jerk of the object or an "action state" (for example, whether a vehicle is changing a lane or is attempting to change the lane).

The recognizer 130 recognizes, for example, a lane in which the vehicle M is traveling (a traveling lane). For example, the recognizer 130 recognizes the traveling lane by comparing patterns of road mark lines (for example, arrangement of continuous lines and broken lines) obtained from the second map information 62 with patterns of road mark lines around the vehicle M recognized from images captured by the exterior camera 10. The recognizer 130 may recognize a traveling lane by recognizing runway boundaries (road boundaries) including road mark lines or shoulders, curbstones, median strips, and guardrails without being limited to road mark lines. In this recognition, the position of the own vehicle M acquired from the navigation device 50 or a process result by INS may be added. The recognizer 130 recognizes temporary stop lines, obstacles, red signals, toll gates, and other road events.

The recognizer 130 recognizes a position or a posture of the own vehicle M in the traveling lane when the recognizer 130 recognizes the traveling lane. For example, the recognizer 130 may recognize a separation from the middle of a lane of a standard point of the own vehicle M and an angle formed with a line extending along the middle of a lane in the movement direction of the own vehicle M as a relative position and posture of the own vehicle M to the traveling lane. Instead of this, the recognizer 130 may recognize a position or the like of the standard point of the own vehicle M with respect to any side end portion (a road mark line or a road boundary) of a traveling lane as the relative position of the own vehicle M to the traveling lane.

The recognizer 130 includes, for example, a parking space recognizer 131 and a parking situation recognizer 132. This configuration is activated in an autonomous parking event to be described below. The details thereof will be described later.

The action plan generator 140 generates a target trajectory along which the own vehicle M travels in future automatedly (irrespective of an operation or the like by a driver) so that the own vehicle M is traveling along a recommended lane determined by the recommended lane determiner 61 and can handle a surrounding situation of the own vehicle M in principle. The target trajectory includes, for example, a speed component. For example, the target trajectory is expressed by arranging spots (trajectory points) at which the own vehicle M will arrive in sequence. The trajectory point is a spot at which the own vehicle M will arrive for each predetermined traveling distance (for example, about several [m]) in a distance along a road. Apart from the trajectory points, target acceleration and a target speed for each of predetermined sampling times (for example, about every fractions of a second) are generated as parts of the target trajectory. The trajectory point may be a position at which the own vehicle M will arrive at a predetermined sampling time for each sampling time. In this case, information regarding the target acceleration or the target speed is expressed according to an interval between the trajectory points.

The action plan generator 140 may set an automated driving event when the target trajectory is generated. As the automated driving event, there are a constant speed traveling event, a low-speed following traveling event, a lane changing event, a branching event, a joining event, a takeover event, an autonomous parking event in which unmanned travel parking is performed in valet parking, and the like. The action plan generator 140 generates the target trajectory in accordance with an activated event.

Of autonomous parking events, an event in which automated parking and automated return are performed through guiding of the parking lot management device 400 is referred to as an autonomous parking event below. The autonomous parking includes an operation in which a vehicle enters an entrance of a parking lot and travels to a parking space through guided automated driving and an operation in which a vehicle parks in a parking space through guided automated driving. The autonomous return is an operation in which a vehicle travels to an exit of a parking lot and leaves from the parking lot, and then the vehicle parks in an area in which an occupant is allowed to board (for example, a stopping area 310 to be described below) through guided automated driving. In the guided automated driving, for example, the own vehicle M moves while detecting, by itself, a route guided by the parking lot management device 400.

The parking lot management device 400 is an example of a management device that manages a parking lot and a management target is not limited to the parking lot. For example, any facility may be used as long as the facility is a facility in which a plurality of vehicles passes two or more spots.

In guided automated driving, for example, the parking lot management device 400 determines a parking space which is a target (hereinafter referred to as a first target parking space) and generates a rough traveling route for heading for the first target parking space based on a map in the parking lot. In this case, the own vehicle M generates a target trajectory based on the rough traveling route generated by the parking lot management device 400. The rough traveling route includes, for example, a link (passage) in which the own vehicle M passes to arrive at a target, a traveling distance, the number of parking spaces by which the own vehicle M passes, a turning position, and a turning direction (a right turn, a left turn, or the like), and indicates a route for traveling to a destination with reference the information. The rough traveling route is expressed, for example, by causing a vehicle to advance a certain number of meters in a passage and turn left or causing a vehicle to advance in a passage of a link ID001 by a certain number of parking spaces and then turn left and to park in a fifth parking space from the front of a passage of link ID002.

The present invention is not limited thereto. The parking lot management device 400 may generate a target trajectory and the own vehicle M may travel along the target trajectory generated by the parking lot management device 400 through guided automated driving. Here, in the following description, as described above, it is assumed that the parking lot management device 400 generates a rough traveling route and the own vehicle M generates a target trajectory.

The action plan generator 140 includes, for example, an autonomous parking controller 141, a target position corrector 142, and a parking position corrector 143 activated when an autonomous parking event is performed. The details of functions of these constituent elements will be described later. The parking position corrector 143 is configured to function in a scene of a second embodiment. The details thereof will be described in the second embodiment.

The second controller 160 controls the travel driving power output device 200, the brake device 210, and the steering device 220 so that the own vehicle M passes along the target trajectory generated by the action plan generator 140 at a scheduled time.

The second controller 160 includes, for example, an acquirer 162, a speed controller 164, and a steering controller 166. The acquirer 162 acquires information regarding a target trajectory (trajectory points) generated by the action plan generator 140 and stores the information in a memory (not shown). The speed controller 164 controls the travel driving power output device 200 or the brake device 210 based on a speed element incidental to the target trajectory stored in the memory. The steering controller 166 controls the steering device 220 in accordance with a curve state of the target trajectory stored in the memory. Processes of the speed controller 164 and the steering controller 166 are realized, for example, by combining feed-forward control and feedback control. For example, the steering controller 166 performs the feed-forward control in accordance with a curvature of a road in front of the own vehicle M and the feedback control based on separation from the target trajectory in combination.

The travel driving power output device 200 outputs a travel driving power (torque) for traveling the vehicle to a driving wheel. The travel driving power output device 200 includes, for example, a combination of an internal combustion engine, an electric motor, and a transmission and an electronic control unit (ECU) controlling them. The ECU controls the foregoing configuration in accordance with information input from the second controller 160 or information input from the driving operator 80.

The brake device 210 includes, for example, a brake caliper, a cylinder that transmits a hydraulic pressure to the brake caliper, an electronic motor that generates a hydraulic pressure to the cylinder, and a brake ECU. The brake ECU controls the electric motor in accordance with information input from the second controller 160 or information input from the driving operator 80 such that a brake torque in accordance with a brake operation is output to each wheel. The brake device 210 may include a mechanism that transmits a hydraulic pressure generated in response to an operation of the brake pedal included in the driving operator 80 to the cylinder via a master cylinder as a backup. The brake device 210 is not limited to the above-described configuration and may be an electronic control type hydraulic brake device that controls an actuator in accordance with information input from the second controller 160 such that a hydraulic pressure of the master cylinder is transmitted to the cylinder.

The steering device 220 includes, for example, a steering ECU and an electric motor.

The electric motor works a force to, for example, a rack and pinion mechanism to change a direction of a steering wheel. The steering ECU drives the electric motor to change the direction of the steering wheel in accordance with information input from the second controller 160 or information input from the driving operator 80.

[Autonomous Parking Event: at Time of Entrance]

Here, a process for causing the own vehicle M to park in the first target parking space in an automated parking event at the time of entrance will be described. A process of generating parking situation information will be described below.

Figure 3:
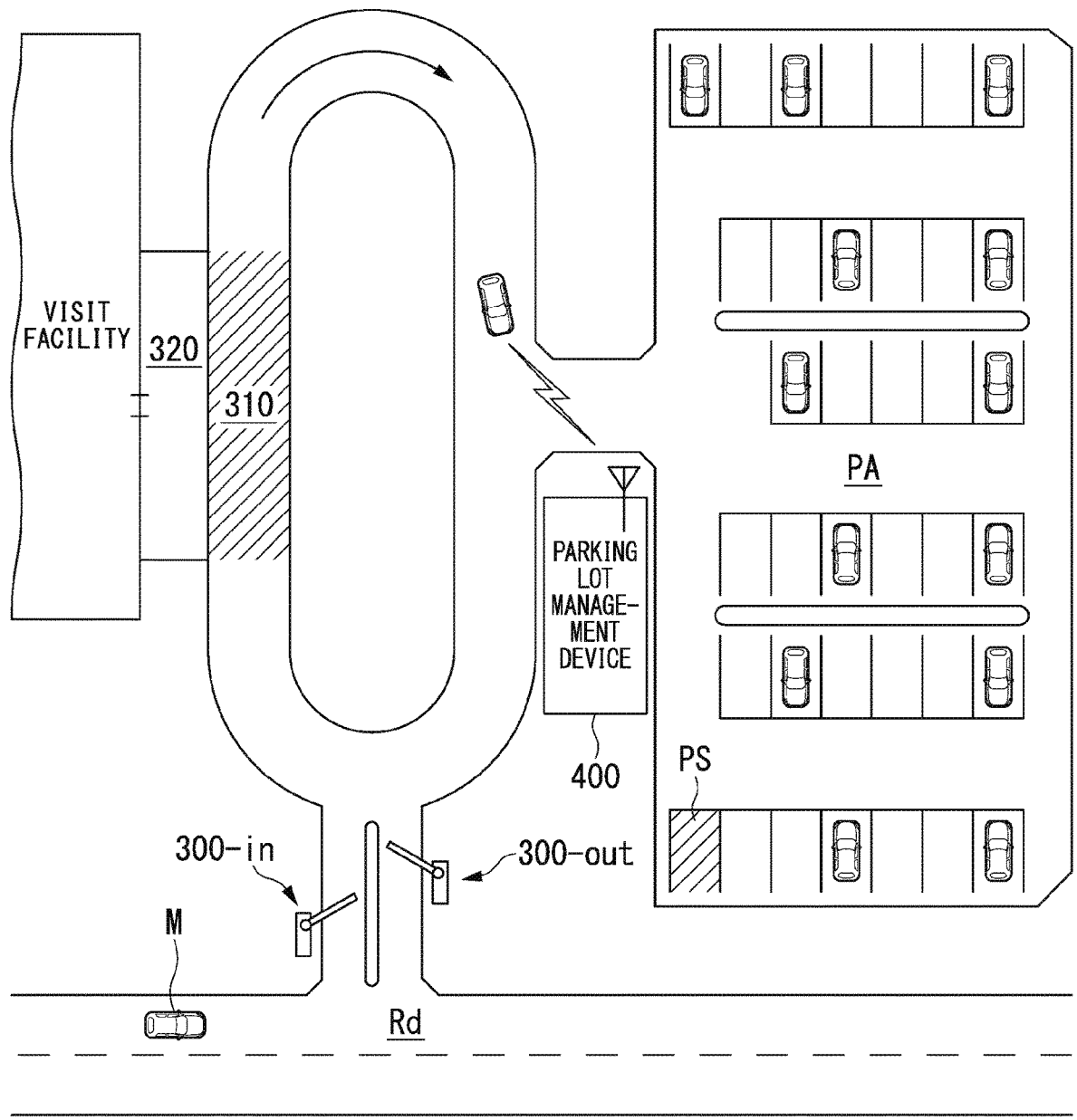
FIG. 3 is a diagram schematically illustrating a scenario in which an autonomous parking event is performed.

The autonomous parking controller 141 causes the own vehicle M to park in a parking space, for example, based on information acquired by the communication device 20 from the parking lot management device 400. FIG. 3 is a diagram schematically illustrating a scenario in which an autonomous parking event is performed. In a route reaching from a road Rd to a visit facility, gates 300-in and 300-out are provided. The own vehicle M passes through the gate 300-in and travels to the stopping area 310 by manual driving or automated driving. The stopping area 310 faces the boarding area 320 connected to the visit facility. In a boarding area 320, an eave is provided to block rain and snow.

After an occupant alights from a vehicle in the stopping area 310, the own vehicle M performs unmanned automated driving and starts an autonomous parking event for moving to the parking space PS in the parking lot PA. A trigger to start the autonomous parking event may be, for example, any operation by a user of the own vehicle M, a user using a terminal device of an owner, or the owner or may be wireless reception of a predetermined signal from the parking lot management device 400. For example, when an automated parking request is received using a terminal device from a user of the own vehicle M, the parking lot management device 400 instructs the own vehicle M to start an automated parking event based on information received from the terminal device and performs guiding for automated parking. The present invention is not limited thereto and the automated parking request may be received using the HMI 30. For example, when the automated parking request is received using the HMI 30 from the user of the own vehicle M, the own vehicle M starts the automated parking event and the parking lot management device 400 performs guiding for automated parking.

When an autonomous parking event starts, the autonomous parking controller 141 controls the communication device 20 such that a parking request is transmitted to the parking lot management device 400. Then, the own vehicle M moves while sensing by itself from the stopping area 310 to the parking lot PA in accordance with guiding of the parking lot management device 400. For example, a rough route to a target parking position is instructed by the parking lot management device 400 and the own vehicle M travels while detecting, by itself, the route instructed by the parking lot management device 400.

Figure 4:
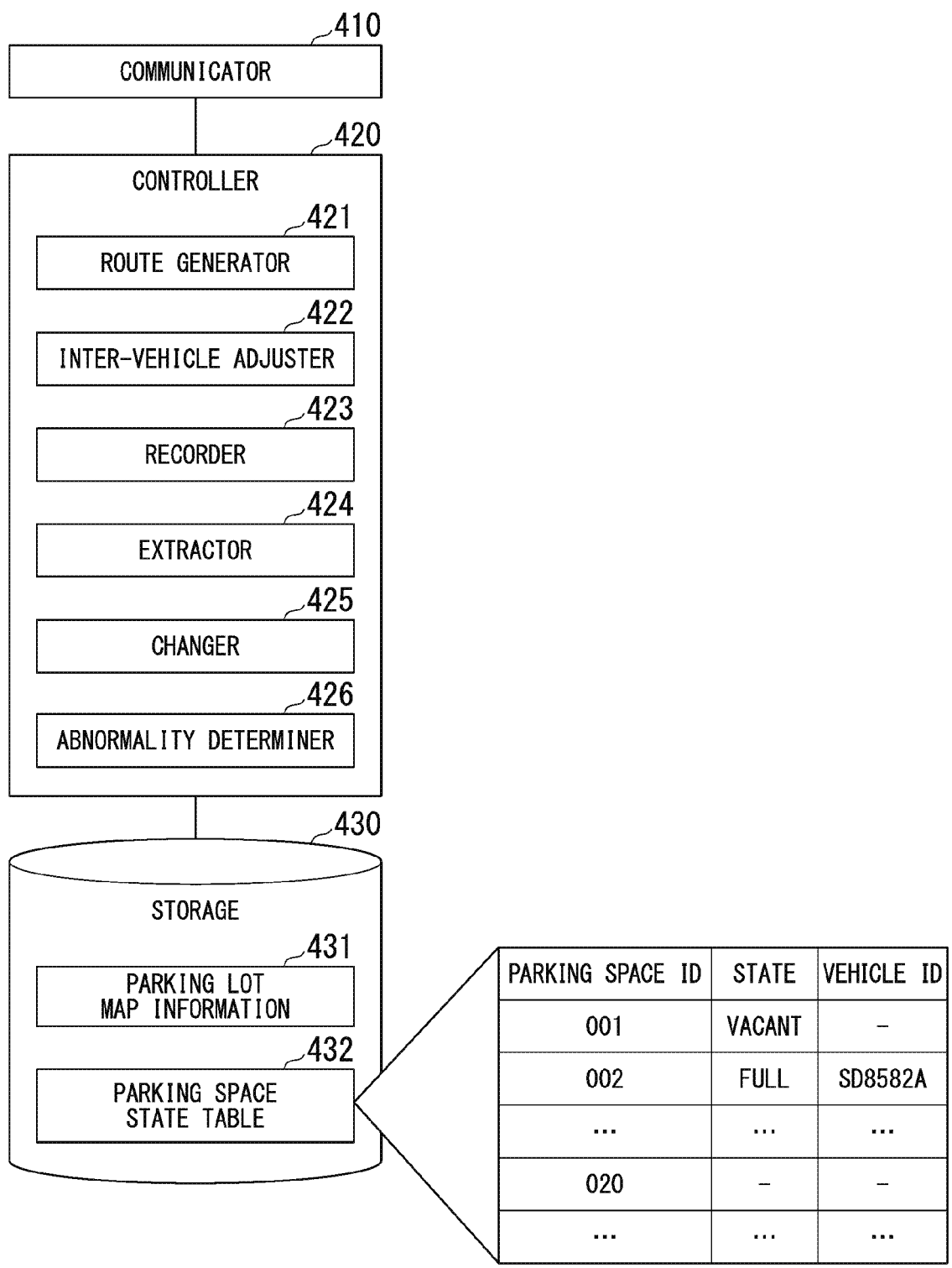
FIG. 4 is a diagram illustrating an example of a configuration of a parking lot management device.

FIG. 4 is a diagram illustrating an example of a configuration of the parking lot management device 400. The parking lot management device 400 includes, for example, a communicator 410, a controller 420, and a storage 430. The storage 430 stores information such as parking lot map information 431 and a parking space state table 432.

The communicator 410 wirelessly communicates with the own vehicle M and other vehicles. The controller 420 includes, for example, a route generator 421, an inter-vehicle adjuster 422, a recorder 423, an extractor 424, a changer 425, and an abnormality determiner 426. The details of the recorder 423, the extractor 424, the changer 425, and the abnormality determiner 426 will be described later.

The route generator 421 guides a vehicle to the parking space PS based on information acquired by the communicator 410 and information stored in the storage 430. For example, the route generator 421 guides the vehicle to the first target parking space by generating the above-described rough route and transmitting information indicating the generated rough route to the vehicle.

The parking lot map information 431 is information indicating the structure of the parking lot PA geometrically. The parking lot map information 431 includes identification information, coordinates, or the like of each parking space PS. In the parking space state table 432, for example, a state which indicates a vacant state or a full (parking) state and a vehicle ID which is identification information of a vehicle which is being parked in the case of the full state are associated with a parking space ID which is identification information of the parking space PS. The parking space ID may be identification information of the parking space obtained by recognizing a display item belonging to the above-described parking space PS or may be identification information allocated by the parking lot management device 400 in a parking lot to which a display item is not supplemented.

When the communicator 410 receives a parking request from a vehicle, the route generator 421 extracts the parking space PS of which a state is a vacant state with reference to the parking space state table 432, acquires a position of the extracted parking space PS from the parking lot map information 431, generates an appropriate rough route to the acquired position of the parking space PS, and transmits information indicating the generated rough route to the vehicle by using the communicator 410.

The inter-vehicle adjuster 422 instructs a specific vehicle to stop or move slowly, as necessary, based on a positional relation between a plurality of vehicles so that the vehicles do not simultaneously advance to the same position.

In a vehicle receiving information indicating the rough route from the parking lot management device 400 (hereinafter referred to as the own vehicle M), the autonomous parking controller 141 generates a target trajectory based on the rough route. When the own vehicle M approaches the parking space PS which is a target, the parking space recognizer 131 recognizes a parking frame line or the like demarcating the parking space PS, recognizes a detailed position of the parking space PS, and supplies the detailed position of the parking space PS to the autonomous parking controller 141. The autonomous parking controller 141 receives the detailed position of the parking space PS, corrects the target trajectory, and causes the own vehicle M to park in the parking space PS.

[Autonomous Parking Event: at Time of Return]

Here, a process of causing the own vehicle M to return in an automated parking event at the time of return will be mainly described below. Since description of a process of generating parking situation information is the same as the description of the process at the time of entrance, description of the process will be omitted.

The autonomous parking controller 141 and the communication device 20 maintain an operation state even while the own vehicle M is parked. For example, when a pickup request from a terminal device of a user is received, for example, the route generator 421 of the parking lot management device 400 generates a route from the parking space PS to the stopping area 310 and transmits the route to the own vehicle M. When information regarding the route is received, the autonomous parking controller 141 of the own vehicle M activates a system of the own vehicle M and causes the own vehicle M to move to the stopping area 310 along the route. At this time, the inter-vehicle adjuster 422 of the parking lot management device 400 instructs a specific vehicle to stop or move slowly, as necessary, based on a positional relation between a plurality of vehicles so that the vehicles do not simultaneously enter the same position, as in at the time of entrance. When the own vehicle M is caused to move to the stopping area 310 and picks up the occupant, the autonomous parking controller 141 stops the operation. Thereafter, manual driving or automated driving by another functional unit starts.

[Autonomous Parking Event: at Time of Entrance (When First Target Parking Space is Vacant)]

The parking situation recognizer 132 recognizes a display item supplemented to the parking space PS while the own vehicle M is traveling. The phrase "the display item is supplemented" may include, for example, drawing a number, text, or the like for identifying each parking space PS or laying a label or the like on which a number, text, or the like for identifying each parking space PS is drawn. The phrase "the display item is supplemented" may also include supplementing in a region of the parking space PS or supplementing in a passage in front of the parking space PS or on a wall or a post near the parking space PS. The parking situation recognizer 132 acquires identification information (of each parking space PS (hereinafter referred to as a parking space identification information) by recognizing this display item. For example, the parking situation recognizer 132 acquires parking space identification information by performing image processing on an image obtained by imaging the display item.

The display item includes, for example, a displayed combination of a number and text for identifying each parking space PS or a 2-dimensional code obtained by encoding a combination of a number and text for identifying the parking space PS. For example, the parking situation recognizer 132 acquires the parking space identification information by recognizing a display item supplemented to the parking space PS adjacent to a passage (including a lane) in which the own vehicle M is traveling in the parking space PS installed in the parking lot PA.

When the parking space identification information is acquired, the parking situation recognizer 132 recognizes a parking situation indicating whether another vehicle is parked in the parking space PS (that is, the parking space PS adjacent to a route in which the own vehicle M is traveling). When the parking situation recognizer 132 recognizes that the other vehicle is parked in the parking space PS (that is, recognizes a parked vehicle), the parking situation recognizer 132 recognizes a number and text displayed on a number plate of the other vehicle which is being parked (the parked vehicle).

When there is no display item supplemented to the parking space PS, the parking situation recognizer 132 may recognize each parking space PS and recognize the position of the recognized parking space PS based on a parking frame line demarcating the parking space PS. For example, the parking situation recognizer 132 recognizes the parking space PS adjacent to the passage in which the own vehicle M is traveling in the parking space PS formed in the parking lot PA. The parking situation recognizer 132 recognizes that the recognized parking space PS is the parking space PS by which the own vehicle M passes during traveling in a rough route instructed from the parking lot management device 400 or the parking space PS by which the own vehicle M passes at the time of traveling of a certain number of km after entering the parking lot PA. The parking situation recognizer 132 recognizes a parking situation of the parking space PS in which the position of the parking space PS is recognized. The parking situation is information indicating whether another vehicle is parked in the target parking space PS.

When there is no display item supplemented to the parking space PS, the parking situation recognizer 132 may recognize the position of the parking space PS (for example, coordinates on a parking lot map, a position indicated by latitude and longitude, or the like) at which the parking frame line is recognized based on the position of the own vehicle M at the time of recognition of the parking frame line.

The parking situation recognizer 132 may recognize a parked vehicle located in a parking space which is not a parking space adjacent to the passage in which the own vehicle M is traveling. For example, when the vehicle turns right in front of the end of the passage, a parked vehicle located in a parking space at the end of the passage may be recognized.

For example, the information generator 150 generates the parking situation information indicating a parking situation of the parking space PS based on a recognition result recognized by the parking situation recognizer 132 while the own vehicle M is traveling to the first target parking space. The information generator 150 may generate the parking situation information indicating the parking situation of the parking space PS based on a recognition result recognized by the parking situation recognizer 132 while the own vehicle M has exited from the parking space PS. For example, the information generator 150 generates the parking situation information for each of the recognized parking spaces PS. Here, in the following description, as described above, the parking situation recognizer 132 is assumed to recognize a parking situation while the vehicle is traveling to the first target parking space.

The parking situation information includes, for example, information indicating whether another vehicle is parked in the parking space PS by which the own vehicle M passes. For example, when the parking situation recognizer 132 recognizes a parked vehicle located in the parking space PS by which the own vehicle M passes, the information generator 150 generates information indicating that the parking situation is "parked" and information indicating identification information (for example, a vehicle number) of the recognized parked vehicle. When the parking situation recognizer 132 does not recognize the parked vehicle located in the parking space PS by which the own vehicle M passes, the information generator 150 generates information indicating that the parking situation is "no parking."

The parking situation information may include information indicating identification information or a position of the parking space PS for which the parking situation recognizer 132 recognizes whether another vehicle is parked (hereinafter referred to as specific information). The specific information is information by which each parking space is specified in accordance with the identification information or the position of the parking space PS. The recognizer 130 of each vehicle recognizes each parking space when a vehicle passes. Hereinafter, an example in which the specific information is the parking space identification information will be described. The information generator 150 generates the parking situation information by associating the parking space identification information acquired by the parking situation recognizer 132 with information indicating whether another vehicle is parked in the parking space PS.

When there is no display item supplemented to the parking space PS, the information generator 150 generates parking position information as the specific information. For example, the information generator 150 derives an order of passing of the parking space PS recognized by the parking situation recognizer 132 when the own vehicle M passes and generates the parking position information indicating the derived order. For each parking space, the information generator 150 may derive a distance by which the own vehicle M has traveled from entrance to the parking lot PA to a recognition time point by the parking situation recognizer 132 when the own vehicle M passes and may generate the parking position information indicating the derived distance. For each parking space, the information generator 150 may acquire the position of the own vehicle M specified by the navigation device 50 at the time of recognition by the parking situation recognizer 132 when the own vehicle M passes and may generate the parking position information indicating the acquired position of the own vehicle M.

The communication manager 152 transmits the information generated by the information generator 150 to the parking lot management device 400 by using the communication device 20. For example, the communication manager 152 transmits the parking situation information generated by the information generator 150 to the parking lot management device 400 at every time of generation of the parking situation information (for each parking space PS).

When the first target parking space becomes close, the parking space recognizer 131 recognizes a parking frame line demarcating the parking space PS, recognizes a detailed position of the first target parking space, and supplies the detailed position to the autonomous parking controller 141.

When the own vehicle M is caused to park in the first target parking space, the information generator 150 generates parking completion information. For example, the information generator 150 generates the parking completion information in which a vehicle ID of the own vehicle is associated with identification information indicating the first target parking space instructed from the parking lot management device 400. The communication manager 152 transmits the parking completion information generated by the information generator 150 to parking lot management device 400 by using the communication device 20.

Figure 5:
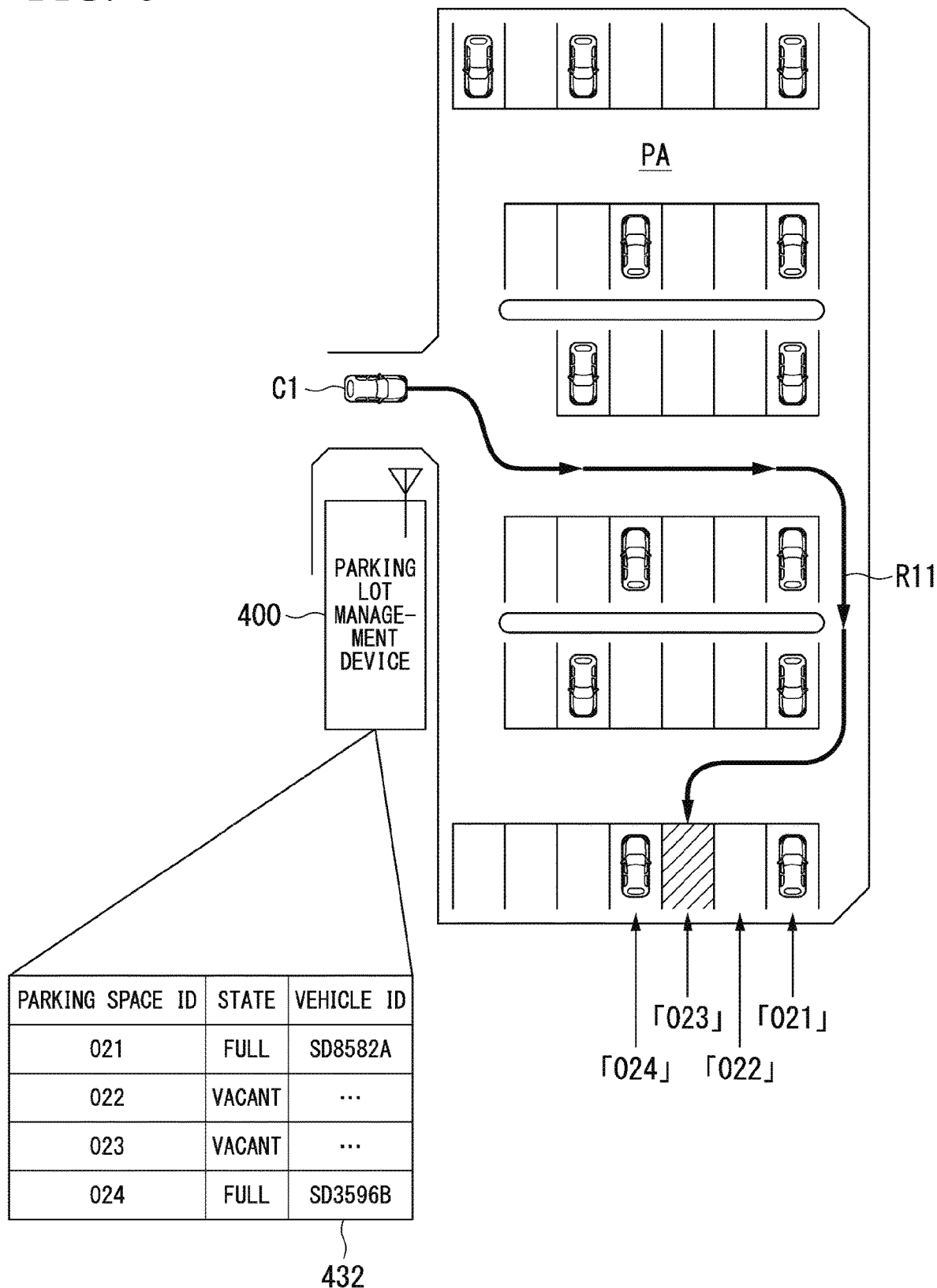
FIG. 5 is a diagram schematically illustrating an example of a route of a first vehicle.

FIG. 5 is a diagram schematically illustrating an example of a guide route of a first vehicle C1. A guide route of the first vehicle C1 instructed from the parking lot management device 400 is a route R11 directed to the first target parking space (ID: [023]). A parking situation is shown in an illustrated parking space state table 432. In the parking space state table 432, a parking space (ID: [021]) and a parking space (ID: [024]) are in a full state and a parking space (ID: [022]) and a parking space (ID: [023]) are in a vacant state. Actual parking situations also match states managed in the parking space state table 432.

When the first vehicle C1 approaches the parking space (ID: [023]), the first vehicle C1 recognizes a parking frame line demarcating the parking space (ID: [023]) and corrects a target trajectory based on a result obtained by recognizing the detailed position of the parking space (ID: [023]). However, the first vehicle C1 is assumed to erroneously recognize a parking frame line demarcating the nearby parking space (ID: [022]) as a target parking space. In this case, the first vehicle C1 is caused to park in the parking space (ID: [022]).

The first vehicle C1 generates parking completion information in which the vehicle ID of the first vehicle C1 is associated with the information indicating the first target parking space instructed from the parking lot management device 400 and transmits the generated parking completion information to the parking lot management device 400. For example, the first vehicle C1 generates parking completion information indicating that parking of vehicle ID "C1" in the parking space (ID: [023]) is completed and transmits the generated parking completion information to the parking lot management device 400. Since the first target parking space is instructed from the parking lot management device 400, the first target parking space may not be included in the parking completion information. In this case, the first vehicle C1 associates the vehicle ID of the first vehicle C1 with the information indicating that the parking is completed and transmits the vehicle ID to the parking lot management device 400.

The parking lot management device 400 writes the fact that the parking space (ID: [023]) is in a full state and the parked vehicle is the first vehicle C1 in the parking space state table 432 using the vehicle ID. Subsequently, the parking lot management device 400 determines that the first target parking space of a second vehicle C2 is the parking space (ID: [022]) with reference to the parking space state table 432, generates a route of the second vehicle C2, and transmits the route to the second vehicle C2.

Figure 6:
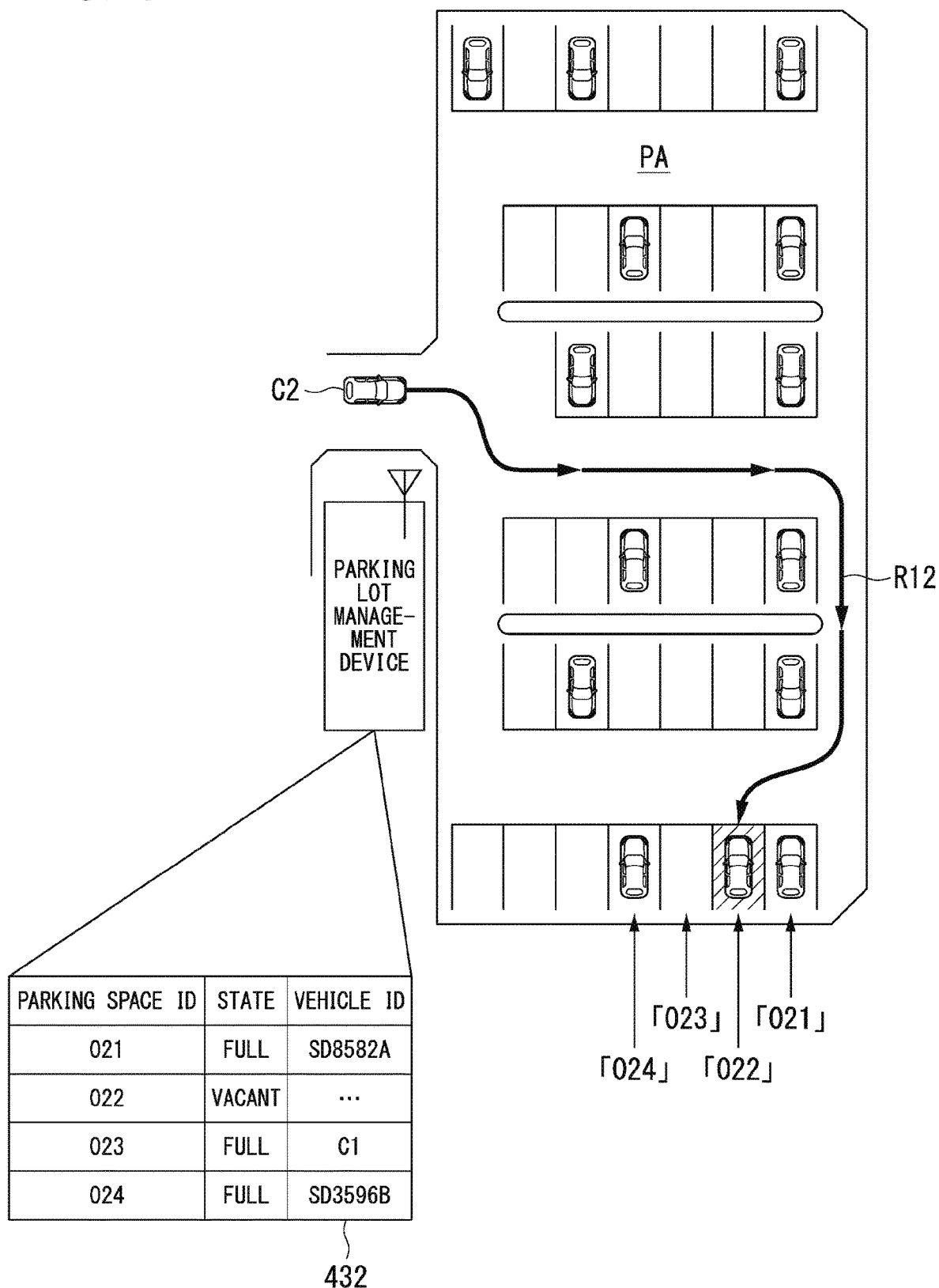
FIG. 6 is a diagram schematically illustrating an example of a route of a second vehicle.

FIG. 6 is a diagram schematically illustrating an example of the guide route of the second vehicle C2. A guide route of the second vehicle C2 is a route R12 directed to the first target parking space (ID: [022]). In the parking space state table 432, as described above, the parking space (ID: [022]) is in a vacant state and the parking space (ID: [023]) is a in a full state. In actual parking states, however, as illustrated in FIG. 6, the parking space (ID: [022]) is in a full state and the parking space (ID: [023]) is a in a vacant state. Therefore, when the second vehicle C2 performs automated traveling along the route R12 and has arrived at the vicinity of the first target parking space (ID: [022]), the second vehicle C2 recognizes that the first vehicle C1 is parked in the first target parking space (ID: [022]). Therefore, the second vehicle C2 performs automated correction parking to correct the target parking space.

When the other vehicle is parked in the first target parking space, the target position corrector 142 searches for a second target parking space in which no other vehicle is parked among the parking spaces PS close to the first target parking space based on a recognition result by the parking situation recognizer 132. The target position corrector 142 corrects the target trajectory directed toward the searched second target parking space based on a recognition result by the parking space recognizer 131 and causes the own vehicle M to park in the second target parking space.

For example, the second vehicle C2 generates wrong parking information when the first vehicle C1 located in the first target parking space (ID: [022]) is recognized. The wrong parking information is, for example, information including identification information of the other vehicle recognized to be parked in the first target parking space and indicating that the other vehicle is parked in the first target parking space which ought to be in the vacant state.

When the parking in the second target parking space is completed, the second vehicle C2 generates the parking completion information indicating that the parking in the second target parking space is completed. In this example, the second vehicle C2 generates parking completion information indicating that the parking of the vehicle with vehicle ID "C2" in the parking space (ID: [023]) is completed. The second vehicle C2 transmits the generated wrong parking information and parking completion information to the parking lot management device 400.

[Parking Lost Management Device: Changing Process]

The extractor 424 extracts the parking space PS in which a parking situation managed by the parking lot management device 400 is different from an actual parking situation based on the parking situation information received from the vehicle with reference to the parking space state table 432. For example, when the wrong parking information is received, the extractor 424 extracts the parking space PS included in the wrong parking information as the parking space PS in which the parking situation is different. The present invention is not limited thereto. The extractor 424 may extract the parking space PS in which the parking situation is different from the actual parking situation indicated by the parking situation information as the parking space PS in which the parking situation is different with reference to the parking space state table 432.

When the extractor 424 extracts the parking space in which the parking space is different from the actual parking situation, the changer 425 changes the parking situation of the extracted parking space in the parking space state table 432. The changer 425 rewrites the parking situation managed by the parking lot management device 400 to the actual parking situation.

The changer 425 assumes that the parking situation is different from the actual parking situation and determines whether there is a vehicle for which a parking space of which a parking situation in the parking space state table 432 is changed is set to the first target parking space. When there is the vehicle for which a parking space of which the parking situation in the parking space state table 432 is changed is set to the first target parking space, the changer 425 changes the target of this vehicle as a third target parking space. For example, the changer 425 determines a parking space in which no other vehicle is parked among parking spaces close to the first target parking space as the third target parking space. When the number of parking spaces in which no other vehicles are parked is plural, the changer 425 determines a parking space which is the closest to the first parking space and is a parking space in which no other vehicle is parked as the third target parking space.

The abnormality determiner 426 determines whether an abnormality occurs based on an extraction result by the extractor 424. The abnormality includes, for example, a temporary defect in which an abnormality temporarily occurs in a system, but the system is recovered afterwards. Although not illustrated, for example, in a parking situation managed by the parking lot management device 400, a parked vehicle is not located in the parking space (ID: [024]) and a parked vehicle is actually located in the parking space (ID: [024]) in some cases. In these cases, in the parking lot management device 400, there is a possibility of occurrence of a situation in which the parking completion information cannot be received from a vehicle or a situation in which the parking completion information cannot be reflected in the table. The abnormality determiner 426 determines that abnormality occurs when a parked vehicle which is not located in a parking situation managed by the parking lot management device 400 is actually being parked in the parking space.

[Autonomous Parking Event: at Time of Entrance (When First Target Parking Space is in Full State)]

When another vehicle is recognized in the first target parking space, the target position corrector 142 specifies a parking space PS in which no other vehicle is parked (hereinafter referred to as a second target parking space) based on a recognition result of a parking situation of a parking space adjacent to the first target parking space. The target position corrector 142 generates a target trajectory to cause the own vehicle M to park in the specified second target parking space and causes the own vehicle M to park in the second target parking space.

Figure 7:
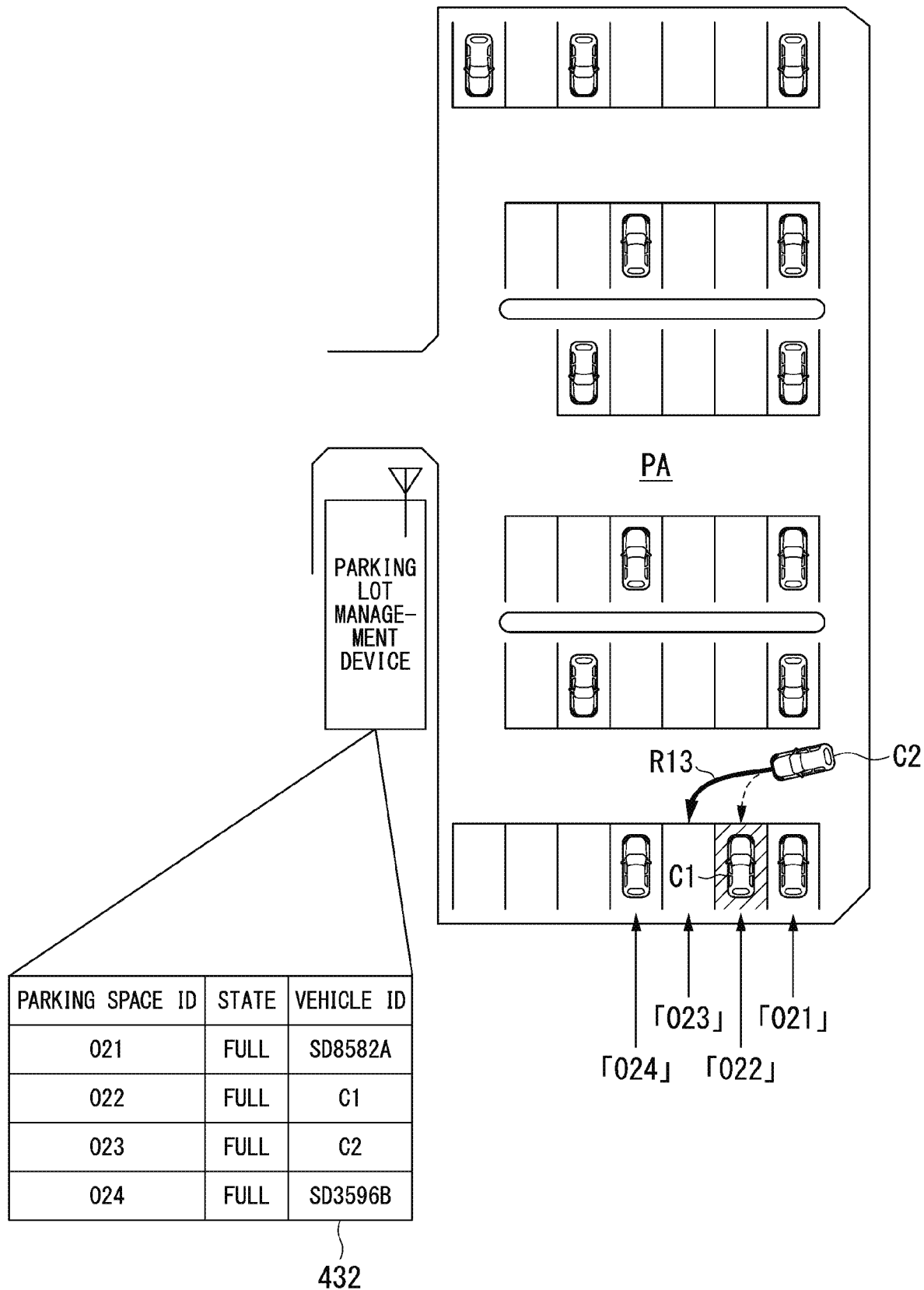
FIG. 7 is a diagram schematically illustrating an example of an automated correction parking of the second vehicle.

FIG. 7 is a diagram schematically illustrating an example of an automated correction parking of the second vehicle C2. The second vehicle C2 recognizes that a parking situation of the parking space (ID: [023]) adjacent to the first target parking space (ID: [022]) is in a vacant state in which there is no parked vehicle. The second vehicle C2 determines the parking space (ID: [023]) as the second target parking space, generates a target trajectory along a route R13 for parking in the second target parking space, and is caused to park there.

When the second vehicle C2 recognizes the parking space (ID: [022]), the second vehicle C2 recognizes a vehicle number "C1" of the first vehicle C1 which is being parked and generates wrong parking information indicating that the vehicle with vehicle ID "C1" is parked in the parking space (ID: [022]). After the parking in the second target parking space is completed, the second vehicle C2 generates parking completion information indicating that the parking of the vehicle ID "C2" in the parking space (ID: [023]) is completed. The second vehicle C2 transmits the generated wrong parking information and parking completion information to the parking lot management device 400. The second vehicle C2 may sequentially transmit the wrong parking information and the parking completion information at generation timings or at the same timing Then, the parking lot management device 400 writes the fact that the parking space (ID: [022]) is in a full state and the parked vehicle is the first vehicle C1 in the parking space state table 432. The parking lot management device 400 rewrites the vehicle ID associated with the parking space (ID: [023]) from "C1" to "C2."

[Autonomous Parking Event: at Time of Entrance (Case of Vehicle with High Externality Detection Performance)]

The route generator 421 of the parking lot management device 400 may generate a guide route so that a distance to the first target parking space is longer for a vehicle with higher externality detection performance (hereinafter referred to as a high-performance vehicle) than for a vehicle with lower externality detection performance (hereinafter referred to as a general vehicle). For example, when information indicating externality detection performance of a vehicle is received from each vehicle and a pre-defined condition of a high-performance vehicle is satisfied, the route generator 421 determines that the vehicle is a vehicle with high externality detection performance. The pre-determined condition of the high-performance vehicle includes, for example, a condition that recognition precision (for example, resolution of a camera, precision of another sensor, or the like) of the vicinity of the vehicle is equal to or greater than a threshold. Information indicating the externality detection performance of the vehicle may be transmitted to the parking lot management device 400 by each vehicle. When a device that detects externality detection performance of a vehicle which passes is installed in the parking lot PA, the device that detects the externality detection performance of the vehicle may transmit the information to the parking lot management device 400.

For example, the route generator 421 selects a parking space which is the closest to the entrance of the parking PA as the first target parking space of a general vehicle and selects a parking space that is the farthest from the entrance of the parking lot PA as the first target parking space of a high-performance vehicle. The present invention is not limited thereto. The route generator 421 may select the same parking space PS for both a general vehicle and a high-performance vehicle as the first target parking space and may set a route to the first target parking space as a route with the shortest distance in the case of a general vehicle and set the route as a detour route in the case of a high-performance vehicle.

Figure 8:
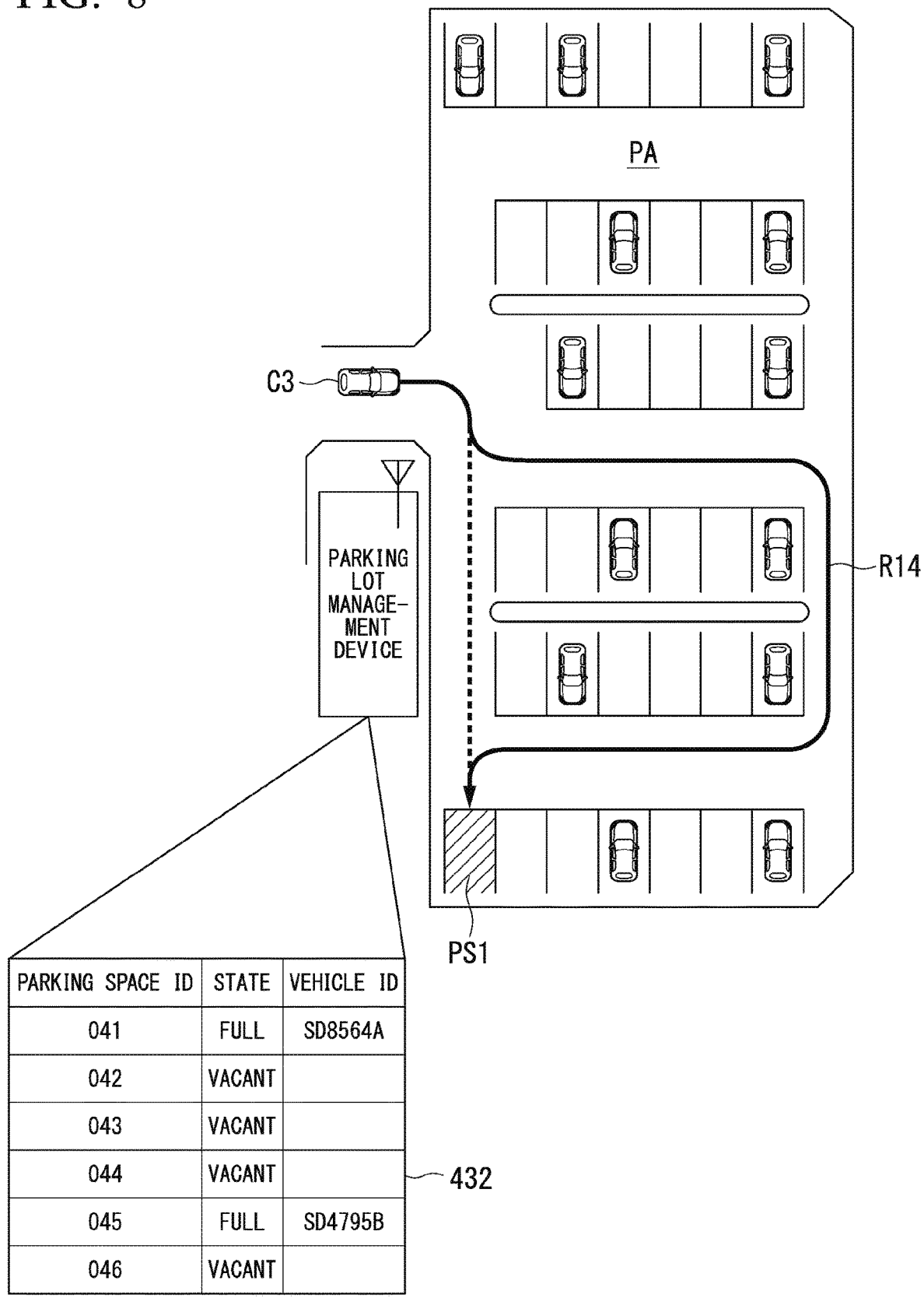
FIG. 8 is a diagram schematically illustrating an example of a route of a third vehicle.

FIG. 8 is a diagram schematically illustrating an example of a guide route of the third vehicle C3. The third vehicle C3 is an example of a high-performance vehicle. A route indicated by a dotted line in the drawing is a route of the shortest distance directed toward the first target parking space (PS1) of the third vehicle C3. The parking lot management device 400 generates a route R14 as a guide route of the third vehicle C3 rather than a route of the shortest distance. For example, the third vehicle C3 generates parking situation information for all the left and right parking spaces PS by which the vehicle passes at the time of traveling along the route R14 and transmits the parking situation information to the parking lot management device 400.

[Flowchart]

Figure 9:
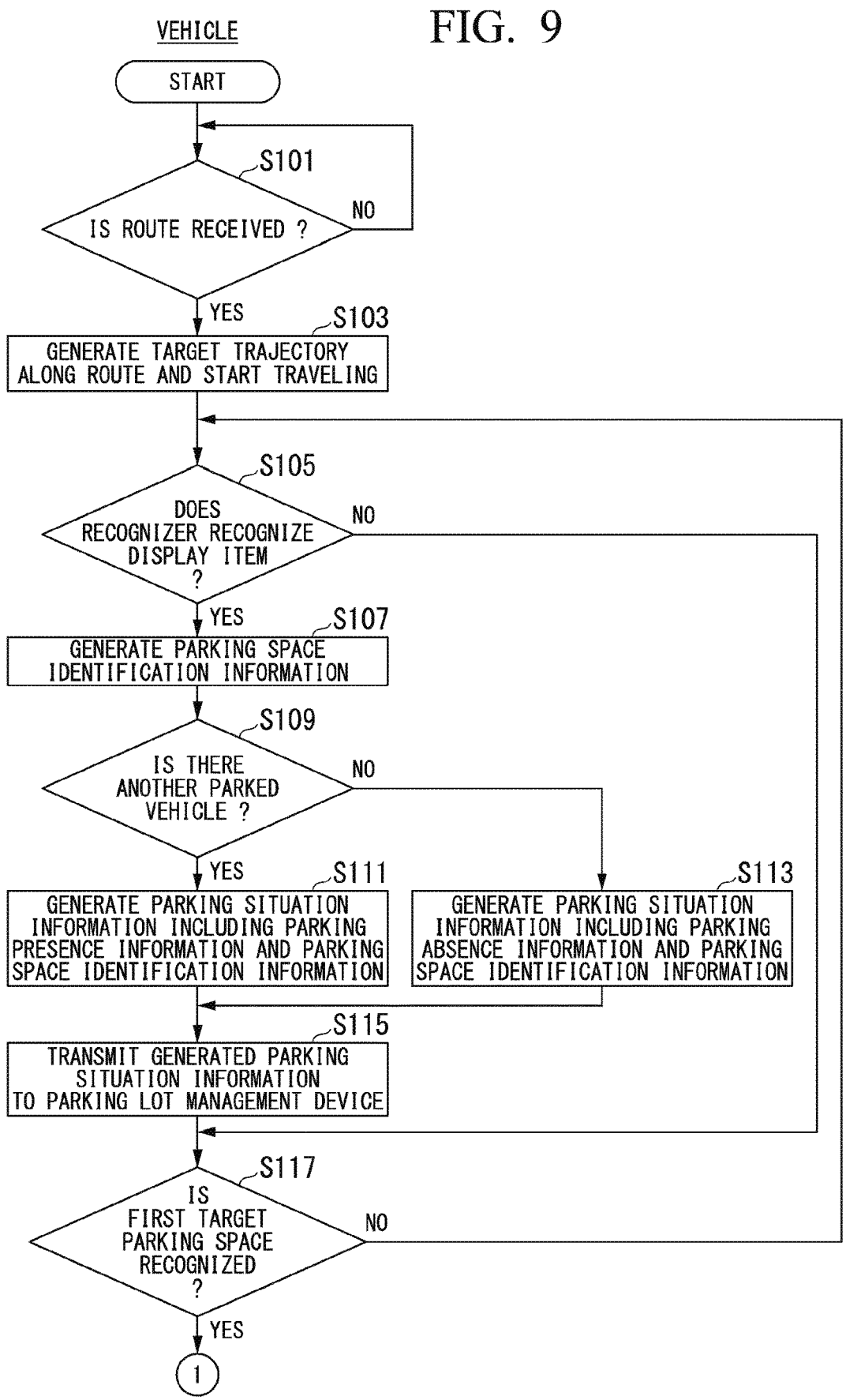
FIG. 9 is a flowchart illustrating an example of a process performed in a vehicle system.

FIG. 9 is a flowchart illustrating an example of a process performed in the vehicle system 1.

First, the autonomous parking controller 141 determines whether information indicating the guide route is received from the parking lot management device 400 (step S101). When the information indicating the guide route is received, the autonomous parking controller 141 generates a target trajectory along the guide route and cause the own vehicle M to travel in the generated target trajectory (step S103). Subsequently, when the parking situation recognizer 132 recognizes a display item supplemented to the parking space PS adjacent to the passage in which the own vehicle M is traveling (step S105), the parking situation recognizer 132 outputs a recognition result to the information generator 150. When the parking situation recognizer 132 does not recognize the display item supplemented to the parking space PS adjacent to the passage in which the own vehicle M is traveling, the process proceeds to step S117 to be described. The information generator 150 generates the parking space identification information based on the recognition result by the parking situation recognizer 132 (step S107).

Subsequently, the parking situation recognizer 132 determines whether the other vehicle is parked in the parking space PS for which the parking space identification information is generated (step S109). When the other vehicle is parked in the parking space PS for which the parking space identification information is generated, the information generator 150 generates parking situation information including information indicating that a parking situation is "parking," identification information (for example, a vehicle number) of the recognized parked vehicle, and the parking space identification information (step S111). Conversely, when it is determined in step S109 that the other vehicle is not parked in the parking space PS for which the parking space identification information is generated, the information generator 150 generates parking situation information including information indicating that a parking situation is "no parking" and the parking space identification information (step S113).

The communication manager 152 transmits the parking situation information generated in step S111 or the parking situation information generated in step S113 to the parking lot management device 400 by using the communication device 20 (step S115).

Subsequently, the parking space recognizer 131 determines whether a parking frame line of the first target parking space is recognized (step S117). When the parking frame line of the first target parking space is not recognized, the process returns to step S105 and the processes are repeated. Conversely, when the parking frame line of the first target parking space is recognized, the parking space recognizer 131 causes the process to proceed to a process illustrated in FIG. 10.

Figure 10:
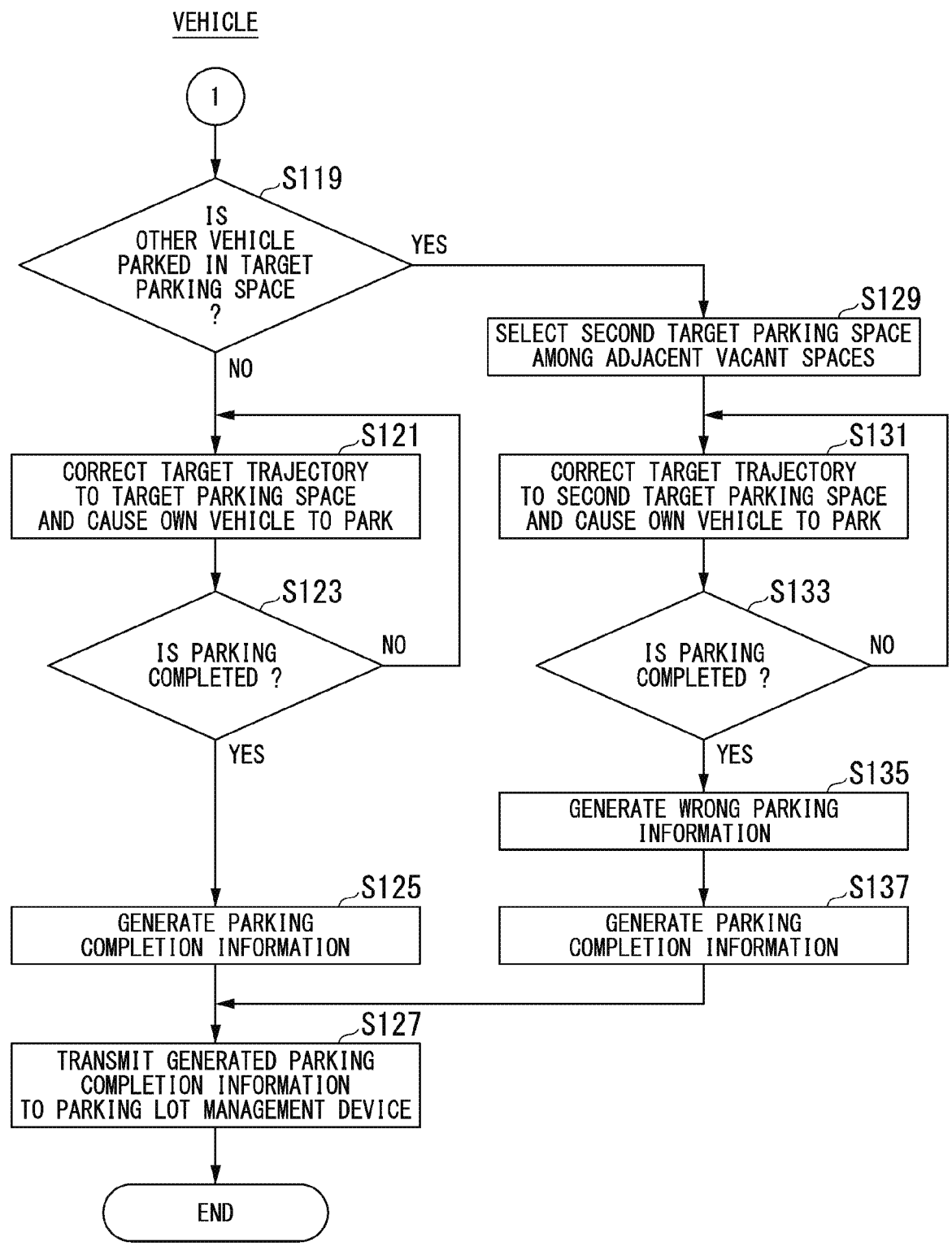
FIG. 10 is a flowchart illustrating an example of a process continued from the process illustrated in FIG. 9.

FIG. 10 is a flowchart illustrating an example of a process continued from the process illustrated in FIG. 9. When the parking frame line of the first target parking space is recognized, the parking situation recognizer 132 determines whether other vehicle is parked in the first target parking space (step S119). When the parking situation recognizer 132 recognizes that no other vehicle is parked in the first target parking space, the autonomous parking controller 141 corrects the target trajectory based on a recognition result by the parking space recognizer 131 and causes the own vehicle M to park in the first target parking space (step S121). When the parking is completed (step S123), the information generator 150 generates the parking completion information (step S125) and the communication manager 152 transmits the generated parking completion information to the parking lot management device 400 (step S127).

The parking situation recognizer 132 acquires the parking space identification information by recognizing the display item supplemented to the parking space PS and determines whether the parking space is the first target parking space based on the acquired parking space identification information. When the display item is not supplemented to the parking space PS, the parking situation recognizer 132 may recognize the position of the parking space and determine whether the parking space is the first target parking space based on the recognized position of the parking space.

Conversely, when it is recognized that the other vehicle is parked in the first target parking space in step S119, the target position corrector 142 selects the second target parking space in which no other vehicle is parked among the parking spaces PS close to the first target parking space based on a recognition result by the parking situation recognizer 132 (step S129). The target position corrector 142 corrects the target trajectory to the selected second target parking space and causes the own vehicle M to park in the second target parking space (step S131). Subsequently, when the parking is completed (step S133), the information generator 150 generates the wrong parking information (step S135) and generates the parking completion information (step S137). Then, the communication manager 152 transmits the generated wrong parking information and parking completion information to the parking lot management device 400 (step S127).

Figure 11:
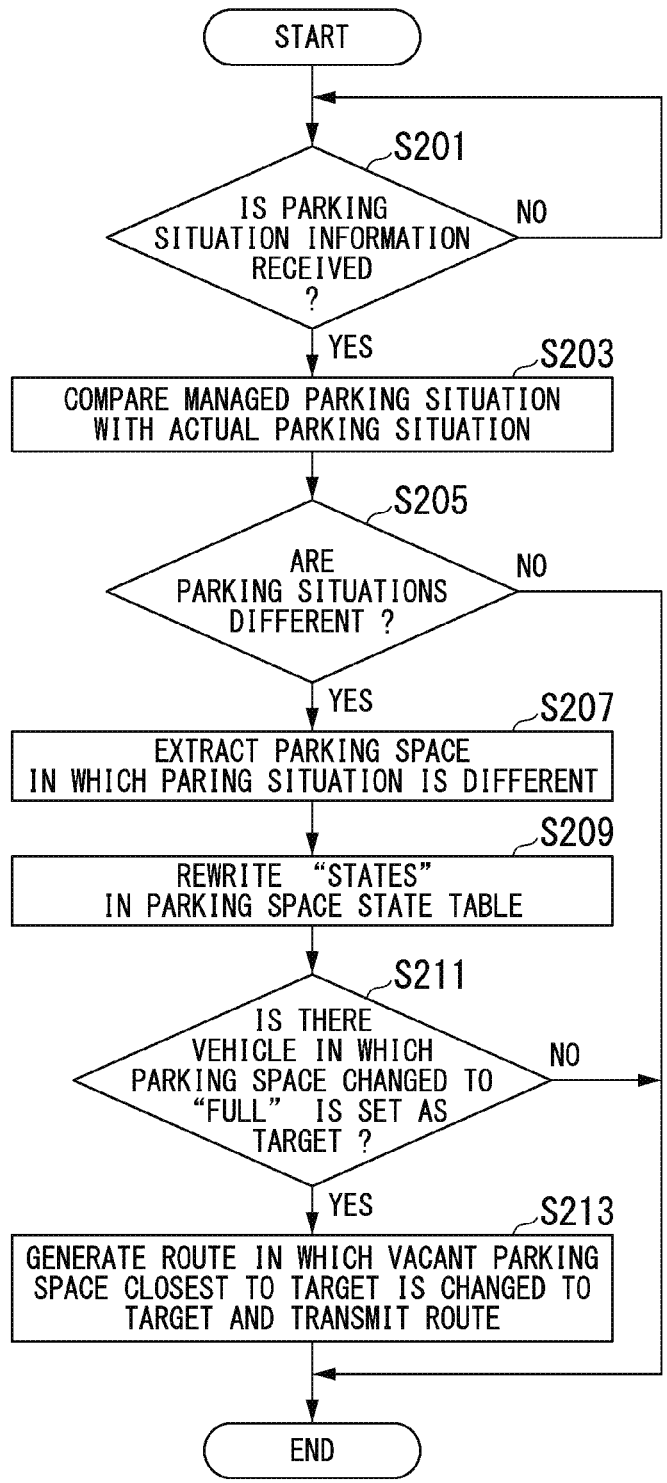
FIG. 11 is a flowchart illustrating an example of a process performed in a parking lot management device.

FIG. 11 is a flowchart illustrating an example of a process performed in the parking lot management device 400. For example, the parking lot management device 400 performs the following processes for each piece of parking situation information or each parking space by which the vehicle passes. First, the extractor 424 determines whether the parking situation information is received by using the communicator 410 (step S201). Until the parking situation information is received, the extractor 424 repeats the process of step S201.

For example, the vehicle recognizes the parking situation of the parking space PS that the vehicle passes in the middle of directing to the first target parking space and transmits the parking situation information to the parking lot management device 400. When the parking situation information is received, the extractor 424 compares the parking situation managed by the parking lot management device 400 with the actual parking situation indicated by the parking situation information with reference to the parking space state table 432 (step S203). When the managed parking situation is different from the actual parking situation (step S205), the extractor 424 extracts the parking space PS in which the managed parking situation is different from the actual parking situation based on the comparison result (step S207). Then, the changer 425 changes the parking situation managed by the parking lot management device 400 ("states" of the parking space state table 432) to the actual parking situation in the extracted parking space PS (step S209).

Subsequently, the changer 425 determines whether there is currently the vehicle which is traveling along the guide route by setting the parking space PS of which the parking situation is changed from "vacant" to "full" in step S209 as the first target parking space (step S211). For example, the parking space state table 432 may include information indicating whether each parking space PS is set as the first target parking space at a current time or the vehicle ID of the vehicle performing the automated parking to the first target parking space. The changer 425 determines whether the parking space PS of which the parking situation is changed from "vacant" to "full" is set as the first target parking space in the parking space state table 432.

When there is the vehicle which is traveling along the guide route by setting the parking space PS of which the parking situation is changed from "vacant" to "full," the changer 425 determines the parking space PS in which no other vehicle is parked as the third target parking space among the parking spaces close to the first target parking space of which the parking situation is changed from "vacant" to "full." Then, the changer 425 changes the target of the target vehicle to the third target parking space (step S213).

Thus, even when a high-performance sensor or a sufficient camera is not provided in the parking lot PA, the parking space in which the parking situation managed in the parking space state table 432 is different from the actual parking situation in the parking lot PA can be extracted. When the parking situation deviates, the parking situation managed in the parking space state table 432 can be corrected to the actual parking situation. Accordingly, the accuracy of the parking situation managed in the parking space state table 432 can be improved without improving the performance of a facility of the parking lot.

Since the vehicle performing the automated parking or the automated return can generate the parking situation information based on the recognition result of the recognizer 130 and transmit the parking situation information to the parking lot management device 400, cost can be suppressed more than when a new camera or sensor is installed in the parking lot PA.

Since the parking lot management device 400 receives the parking situation information regarding all the parking spaces PS in which the vehicle passes in an adjacent passage from the vehicle directed to the first target parking space, accuracy of the parking situation managed in the parking space state table 432 can be improved.

Summary of Embodiment

As described above, the vehicle management system according to the embodiment includes: a management device that guides a vehicle capable of performing automated traveling to a target parking space with reference to management information indicating parking situations of a plurality of parking spaces; a communicator configured to receive parking situation information which is information generated based on a recognition result by a recognizer recognizing a surrounding situation of the vehicle, the parking situation information indicating whether another vehicle is parked in a parking space adjacent to a route along which the vehicle is traveling; and an extractor configured to extract a parking space in which a parking situation managed with the management information is different from an actual parking situation based on the received parking situation information. Thereby, it is possible to acquire the parking situation simply and notify the management device of the parking situation, and it is possible to manage the parking situation of the parking space in the valet parking more accurately.

The example in which the communication manager 152 transmits the generated parking situation information to the parking lot management device 400 has been described. The generated parking situation information may be transmitted to a parked vehicle and the parked vehicle may transmit the parking situation information to the parking lot management device 400. For example, when the parking space PS in which the own vehicle M passes is recognized, the communication manager 152 transmits the parking space identification information (or the parking position information) of the recognized parking space PS to a fourth vehicle parked in the recognized parking space PS instead of transmitting the parking situation information to the parking lot management device 400. The fourth vehicle transmits information in which the received parking position information is associated with the vehicle ID of the fourth vehicle to the parking lot management device 400. Based on the information received from the fourth vehicle, the parking lot management device 400 determines whether the position of the parking space PS in which the fourth vehicle is actually parked matches the position of the parking space PS managed in the parking space state table 432. When the positions of the parking spaces PS do not match each other, the changer 425 changes the parking situation managed by the parking lot management device 400 to the actual parking situation. Thus, the actual parking situation is upload from the fourth vehicle which is being parked to the parking lot management device 400, and thus it is possible to reduce a communication load of the own vehicle M which is performing the automated parking.

Second Embodiment

In the above-described first embodiment, the example in which the parking lot management device 400 changes the parking space state table 432 based on the parking situation information received from the vehicle has been described. In a second embodiment, an example in which a vehicle corrects a parking situation and the parking lot management device 400 does not change the parking space state table 432 when the vehicle wrongly parks in target different from guiding by the parking lot management device 400 will be described. Except for this, detailed description of the same content as that of the first embodiment will be omitted and different content will be described below.

Figure 12:
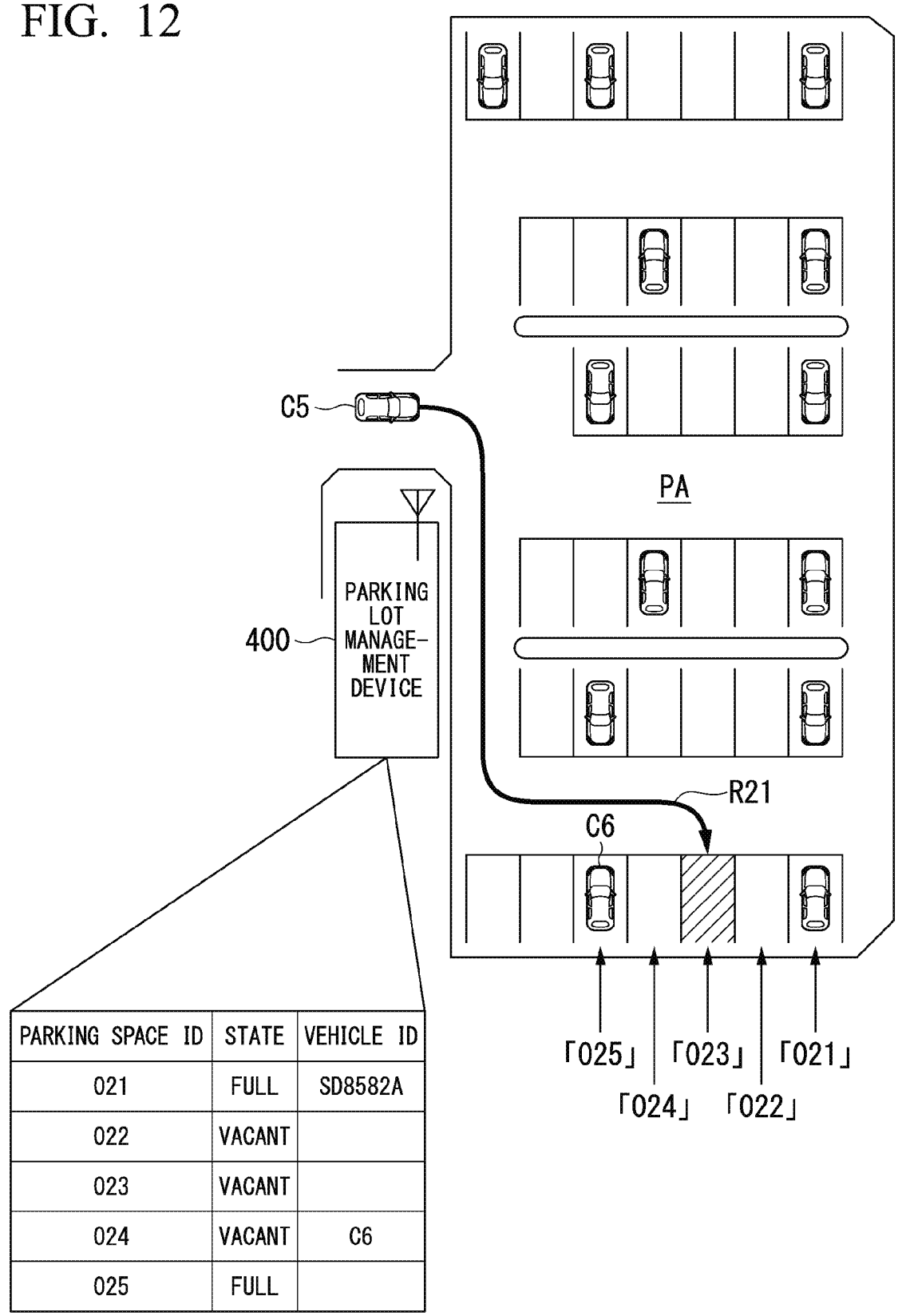
FIG. 12 is a diagram schematically illustrating an example of a route of a fifth vehicle.

FIG. 12 is a diagram schematically illustrating an example of a guide route of the fifth vehicle C5. The fifth vehicle C5 is scheduled to travel along a route R21 in accordance with guiding by the parking lot management device 400 and perform automated parking in a first target parking space (ID: [023]). When the fifth vehicle C5 passes by the parking space (ID: [025]), the fifth vehicle C5 generates parking space identification information indicating the parking space (ID: [025]) and recognizes that a sixth vehicle C6 is parked in the parking space (ID: [025]). In this case, the fifth vehicle C5 transmits the generated parking space identification information to the sixth vehicle C6. Hereinafter, an example in which the fifth vehicle C5 generates the parking space identification information regarding the parking space recognized at the time of passing will be described, but the present invention is not limited thereto. For example, the fifth vehicle C5 may generate parking position information indicating each parking space at the time of passing.

Subsequently, the fifth vehicle C5 generates parking space identification information indicating the parking space (ID: [024]) at the time of passing of the parking space (ID: [024]) and recognizes that no other vehicle is parked in the parking space (ID: [024]). In this case, the fifth vehicle C5 generates parking situation information including the generated parking space identification information and information indicating that the parking situation is "no parking" and transmits the parking situation information to the parking lot management device 400.

When the parking space identification information is received from the fifth vehicle C5, the sixth vehicle C6 reads identification information of the first target parking space guided by the parking lot management device 400 at the time of the automated parking from a storage of the sixth vehicle C6 and compares the read identification information of the first target parking space with the received parking space identification information. In this example, the identification information of the first target parking space of the sixth vehicle C6 is [024] and the parking space identification information received from the fifth vehicle C5 is [025]. When the identification information of the first target parking space does not match the parking space identification information received from the fifth vehicle C5, the sixth vehicle C6 moves to the first target parking space. That is, the sixth vehicle C6 comes out from the parking space (ID: [025]) in which the sixth vehicle C6 is parked and moves to the nearby parking space (ID: [024]).

When specific information by which the parking space PS is specified with a position or identification information is received from another vehicle, the parking position corrector 143 determines whether the parking space specified with the specific information received from the other vehicle matches the first target parking space designated by the parking lot management device 400. When the parking space matches the first target parking space, the parking position corrector 143 does not correct the parking position of the own vehicle M. Conversely, when the parking space does not match the first target parking space, the parking position corrector 143 causes the own vehicle M to perform the automated parking such that the parking position of the own vehicle M is corrected to the first target parking space designated by the parking lot management device 400. That is, the parking position corrector 143 causes the own vehicle M to move to the initial first target parking space.

Figure 13:
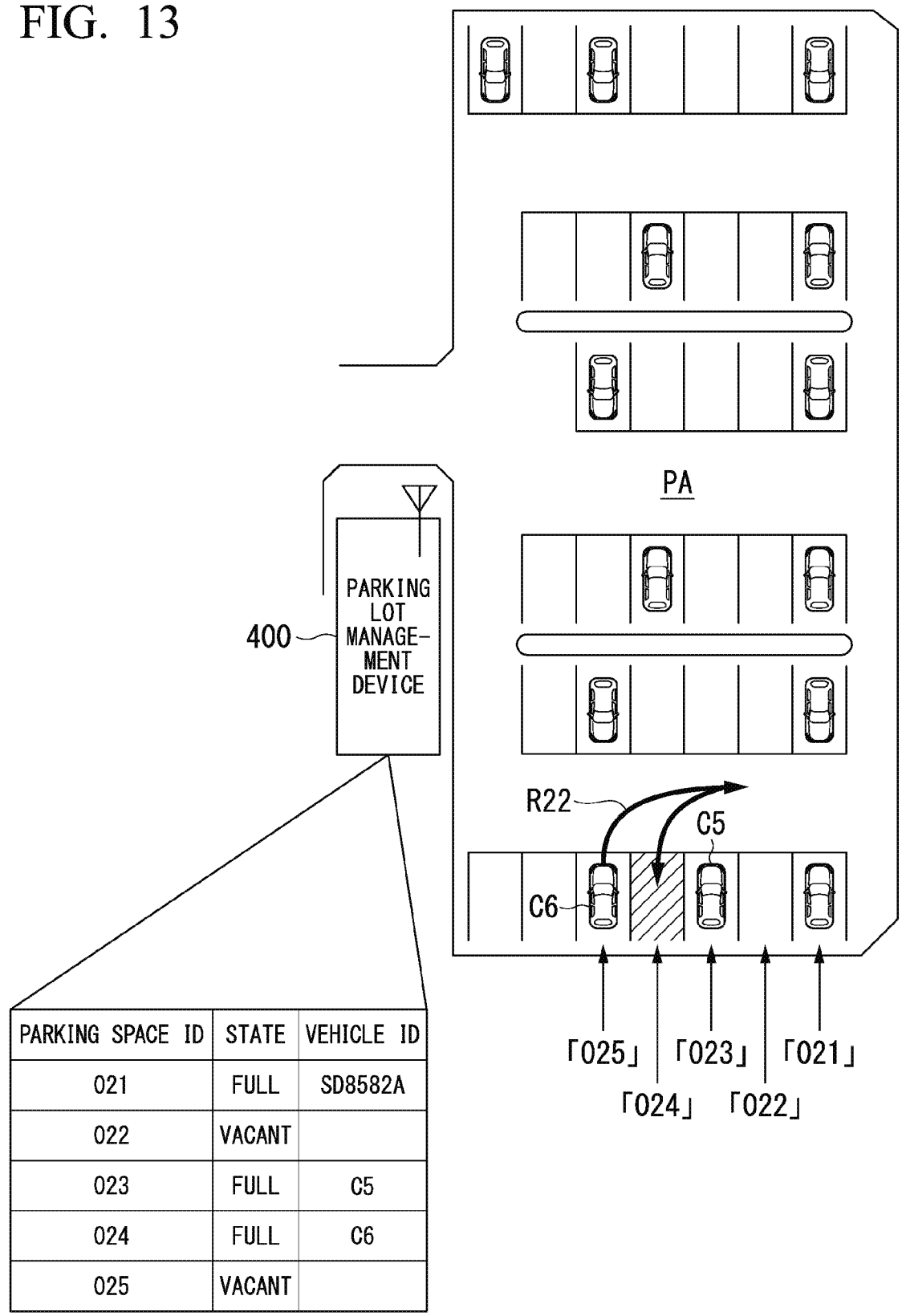
FIG. 13 is a diagram schematically illustrating an example of a corrected route of a sixth vehicle.

FIG. 13 is a diagram schematically illustrating an example of a corrected route of the sixth vehicle C6. Based on the specific information of the parking space received from the fifth vehicle C5 and the first target parking space designated by the parking lot management device 400, the parking position corrector 143 of the sixth vehicle C6 determines where a parking space to which the sixth vehicle C6 will move using the position of the parking space in which the sixth vehicle C6 is currently parked as a standard is located. In the illustrated example, the sixth vehicle C6 determines that a right neighboring parking space of the parking space (ID: [025]) in which the sixth vehicle C6 is currently parked is a vehicle space (ID: [024]) and is a correct parking space (the first target parking space). The sixth vehicle C6 generates a route R22 used to come out from the parking space (ID: [025]) in which the sixth vehicle C6 is currently parked and to park in the right neighboring parking space (ID: [024]). When the parking in the parking space (ID: [024]) is completed, the sixth vehicle C6 generates correction information and transmits the correction information to the parking lot management device 400. The correction information includes, for example, specific information for specifying the parking space in which the vehicle is wrongly parked before the movement (correction) and specific information for specifying the parking space in which the vehicle is parked after the movement (correction).

[Flowchart]

Figure 14:
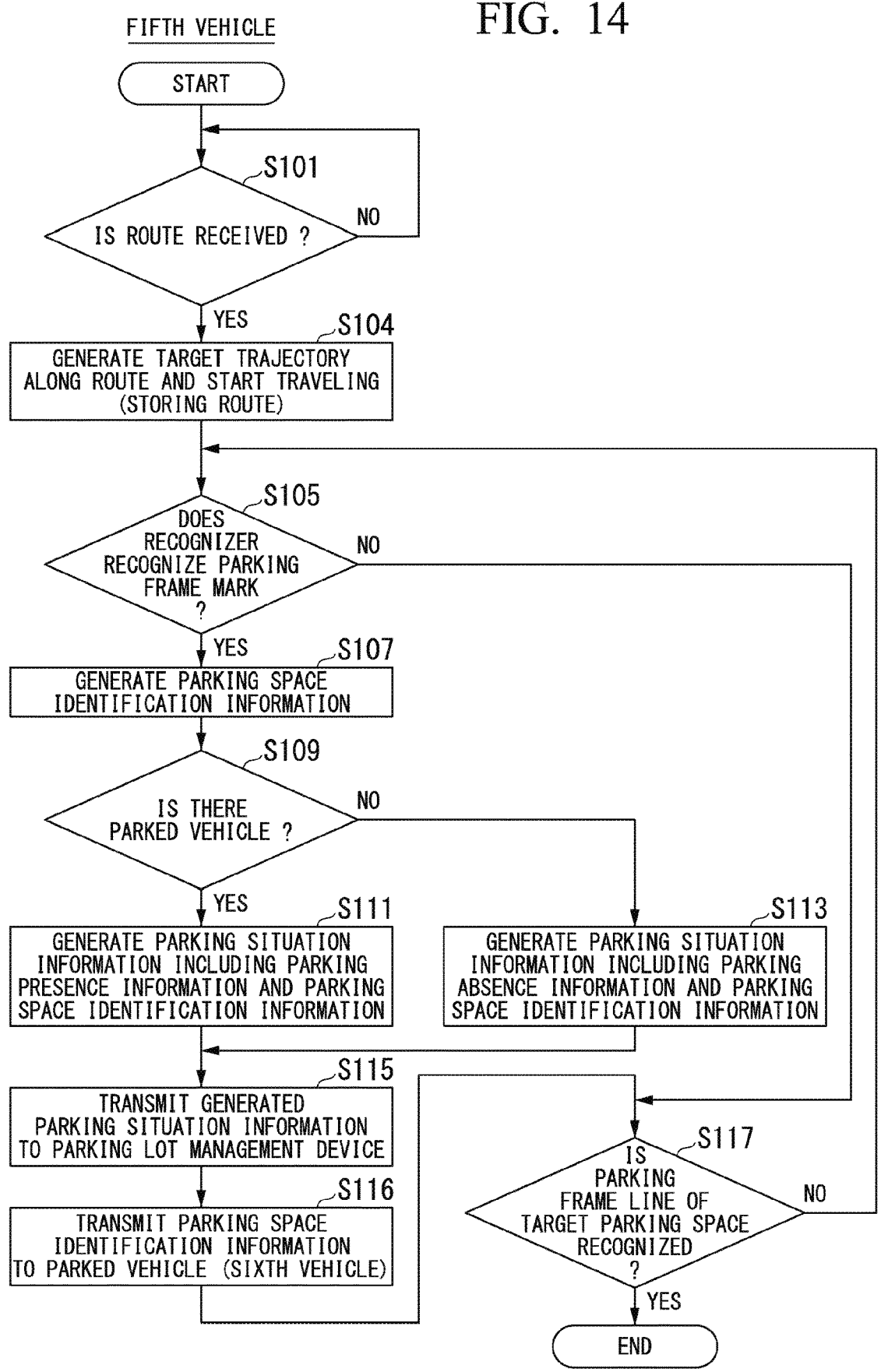
FIG. 14 is a flowchart illustrating an example of a process performed in the fifth vehicle.

FIG. 14 is a flowchart illustrating an example of a process performed in the fifth vehicle C5.

The same reference signs are given to processes similar to the processes described with reference to FIG. 9. First, the autonomous parking controller 141 of the fifth vehicle C5 determines whether information indicating a route is received from the parking lot management device 400 (step S101). When the information indicating the route is received, the autonomous parking controller 141 of the fifth vehicle C5 stores information regarding the received route (including information indicating the first target parking space or way) in a storage of the fifth vehicle C5, generates a target trajectory along the route, and causes the fifth vehicle C5 to park along the generated target trajectory (step S104).

Subsequently, when the parking frame line of the parking space PS (ID: [025]) is recognized (step S105), the parking situation recognizer 132 of the fifth vehicle C5 outputs a recognition result to the information generator 150. Based on the recognition result by the parking situation recognizer 132, the information generator 150 of the fifth vehicle C5 generates the parking space identification information of the parking space PS (ID: [025]) (step S107).

Subsequently, the parking situation recognizer 132 of the fifth vehicle C5 determines whether another vehicle is parked in the parking space PS (ID: [025]) for which the parking space identification information is generated (step S109). Since the sixth vehicle C6 is parked in the parking space PS for which the parking space identification information is generated, the information generator 150 of the fifth vehicle C5 generates the parking situation information including the information indicating that a parking situation is "parking," identification information (for example, a vehicle number) of the recognized parked vehicle, and the parking space identification information (step S111). Then, the communication manager 152 of the fifth vehicle C5 transmits the parking situation information generated in step S111 to the parking lot management device 400 by using the communication device 20 (step S115).

Subsequently, the communication manager 152 of the fifth vehicle C5 transmits the parking space identification information generated in step S107 to the sixth vehicle C6 by using the communication device 20 (step S116). The parking space recognizer 131 of the fifth vehicle C5 determines whether the parking frame line of the first target parking space is recognized (step S117). When the parking frame line of the first target parking space is not recognized, the process returns to step S105 to repeat the process. Conversely, when the parking frame line of the first target parking space is recognized, the parking space recognizer 131 of the fifth vehicle C5 causes the process to proceed to the process illustrated in FIG. 10.

Figure 15:
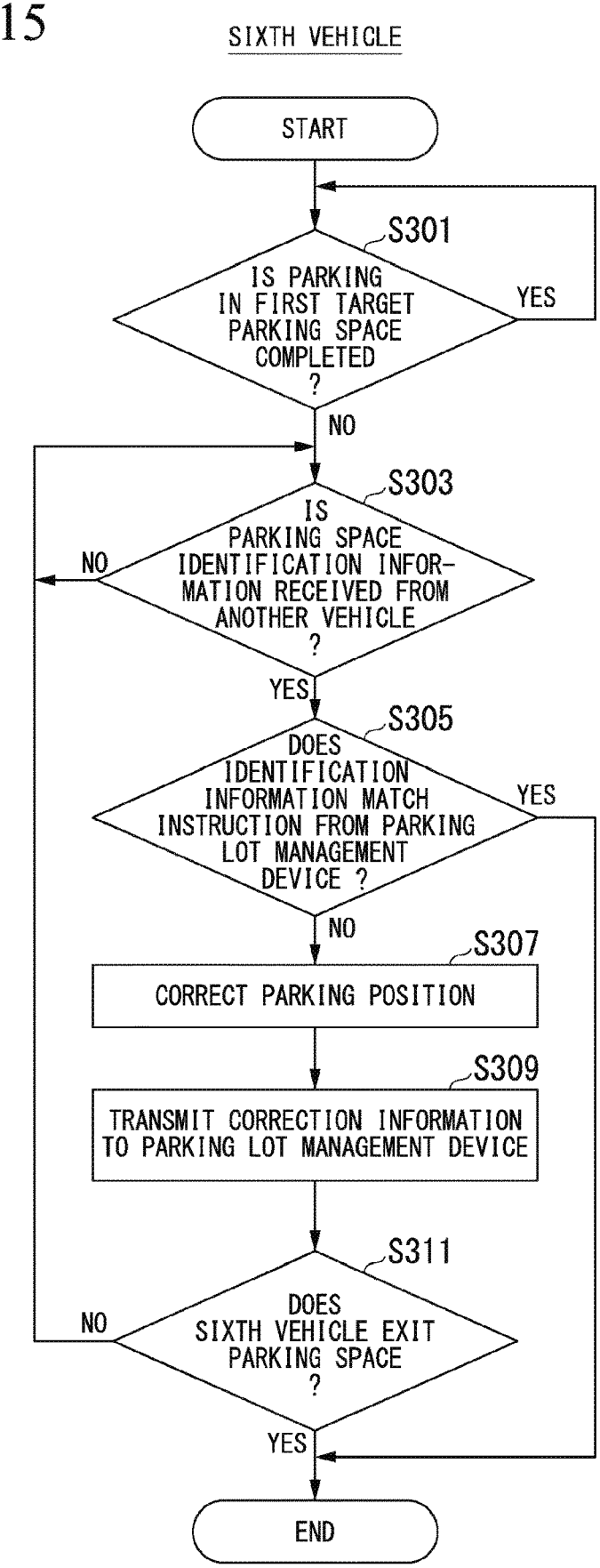
FIG. 15 is a flowchart illustrating an example of a process performed in the sixth vehicle.

FIG. 15 is a flowchart illustrating an example of a process performed in the sixth vehicle C6.

The autonomous parking controller 141 of the sixth vehicle C6 determines whether the parking in the first target parking space is completed (step S301). When the parking in the first target parking space is completed, the parking position corrector 143 of the sixth vehicle C6 determines whether the parking space identification information is received from another vehicle (step S303). In this example, the sixth vehicle C6 receives the parking space identification information from the fifth vehicle C5 and determines whether the identification information of the first target parking space matches the parking space identification information received from the fifth vehicle C5 (step S305). In this example, since the identification information of the first target parking space of the sixth vehicle C6 is [024] and the parking space identification information received from the fifth vehicle C5 is [025], the parking position corrector 143 of the sixth vehicle C6 determines that the identification information does not match the parking space identification information.

Then, the parking position corrector 143 of the sixth vehicle C6 corrects the parking position to the first target parking space (step S307). That is, the sixth vehicle C6 comes out from the parking space (ID: [025]) in which the sixth vehicle C6 is parked and moves to the nearby parking space (ID: [024]). Then, the information generator 150 generates correction information and the communication manager 152 transmits the generated correction information to the parking lot management device 400 (step S309). In this example, the information generator 150 of the sixth vehicle C6 generates the correction information including specific information (ID: [025]) for specifying the parking space before the movement (correction) and specific information (ID: [024]) for specifying the parking space after the movement (correction). Subsequently, the autonomous parking controller 141 of the sixth vehicle C6 determines whether the sixth vehicle C6 exits the parking space (step S311). When the sixth vehicle C6 does not exit the parking space, the process returns to step S303 to repeat the process.

Conversely, when the sixth vehicle C6 exits the parking space, the process ends.

Figure 16:
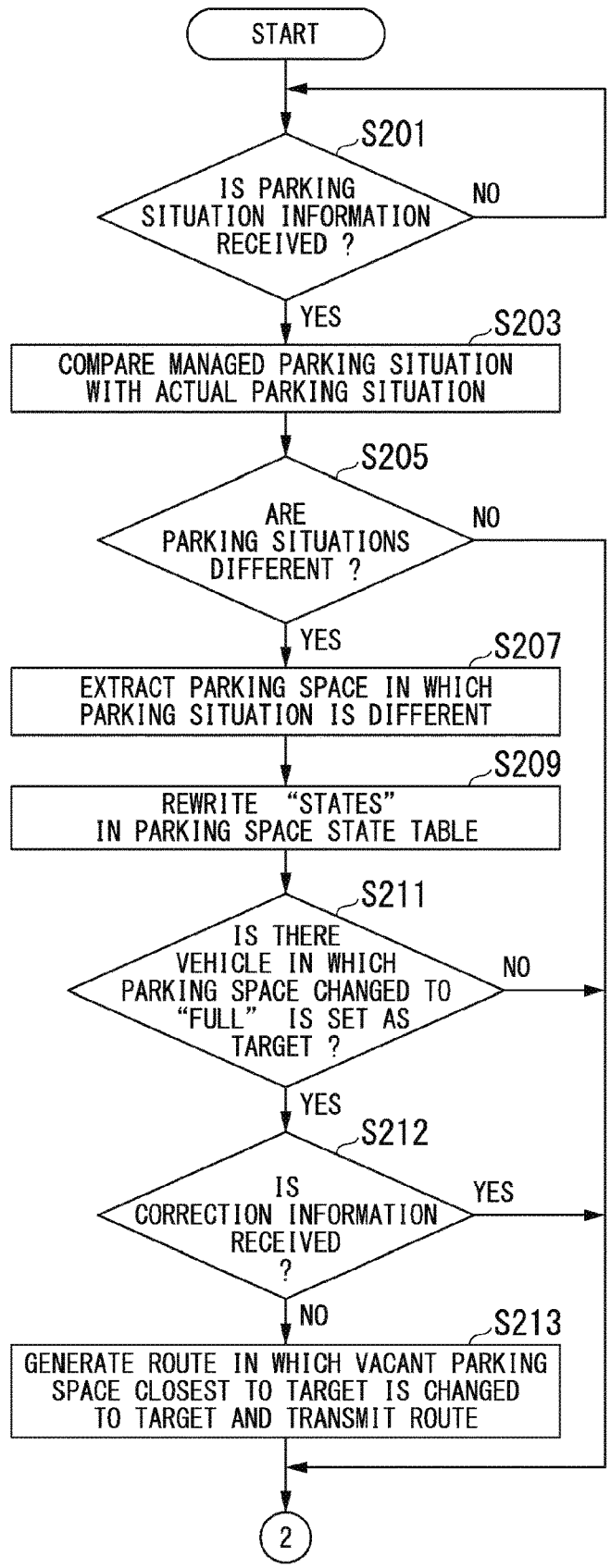
FIG. 16 is a flowchart illustrating another example of a process performed in the parking lot management device.

FIG. 16 is a flowchart illustrating another example of a process performed in the parking lot management device 400. The same reference signs are given to content similar to the content described with reference to FIG. 11 and detailed description thereof will be omitted. In step S211, when it is determined in step S211 that there is currently a vehicle scheduled to park in the parking space PS of which the parking situation is changed from "vacant" to "full," the changer 425 determines whether the correction information regarding the parking space PS of which the parking situation is changed from "vacant" to "full" is received (step S212). When the correction information is not received, the changer 425 causes the process to proceed to a process of FIG. 17.

Figure 17:
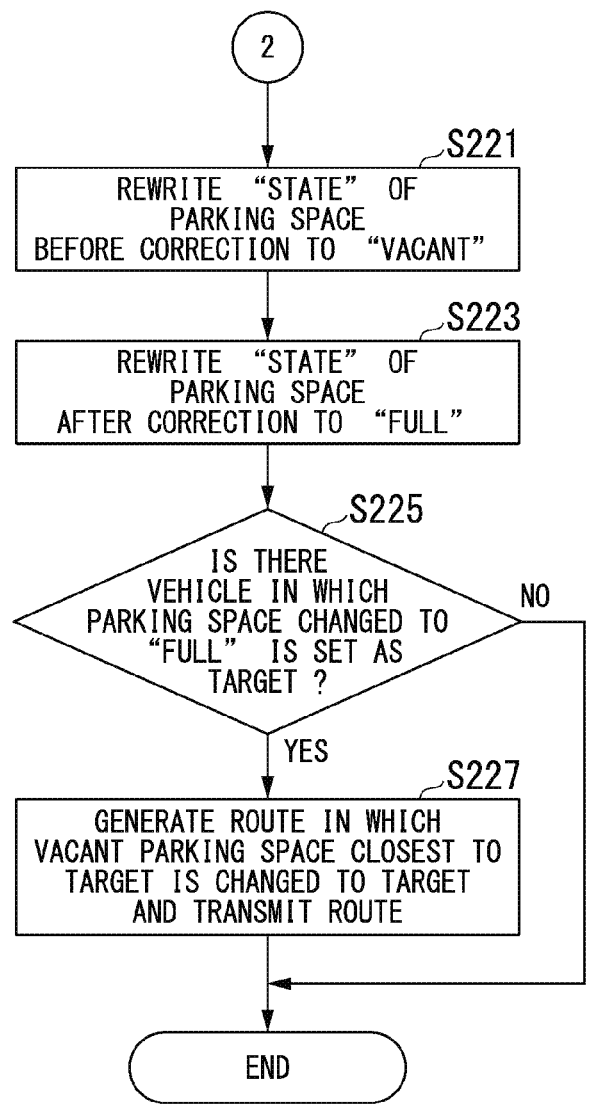
FIG. 17 is a flowchart illustrating an example of a process continued from the process illustrated in FIG. 16.

FIG. 17 is a flowchart illustrating an example of a process continued from the process illustrated in FIG. 16. When the correction information is received, the changer 425 rewrites a "state" associated with the parking space identification information (ID: [025]) in the parking space state table 432 to "vacant" based on the parking space identification information (ID: [025]) before the correction included in the correction information (step S221). Subsequently, the changer 425 rewrites a "state" associated with the parking space identification information (ID: [024]) in the parking space state table 432 to "vacant" based on the parking space identification information (ID: [024]) after the correction included in the correction information (step S223).

Subsequently, the changer 425 determines whether there is currently a vehicle scheduled to park in the parking space PS of which the parking situation is changed from "vacant" to "full" in step S223 (step S225). When there is currently the vehicle scheduled to park in the parking space PS of which the parking situation is changed from "vacant" to "full," the changer 425 determines the parking space PS in which no other vehicle is parked among the parking spaces close to the first target parking space of which the parking situation is changed from "vacant" to "full" as the third target parking space. Then, the changer 425 changes the target of the target vehicle to the third target parking space (step S227).

Thus, it is possible to adjust the parking positions of the vehicles parked in the parking lot in accordance with parking situations managed in the parking space state table 432 without improving the performance of the facility of the parking lot.

[Hardware Configuration]

Figure 18:
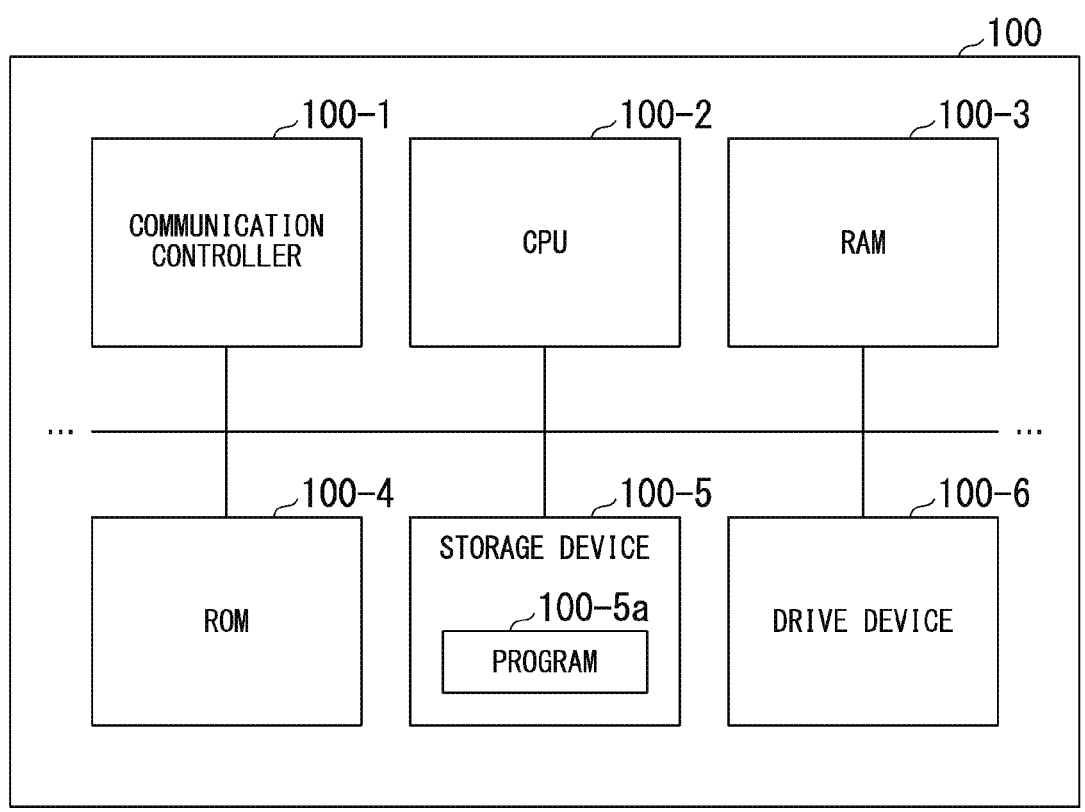
FIG. 18 is a diagram illustrating an example of a hardware configuration of an automated driving control device according to the embodiment.

FIG. 18 is a diagram showing an example of a hardware configuration of the automated driving control device 100 according to an embodiment. As shown, the automated driving control device 100 is configured such that a communication controller 100-1, a CPU 100-2, a random access memory (RAM) 100-3 that is used as a working memory, a read-only memory (ROM) 100-4 that stores a boot program or the like, a storage device 100-5 such as a flash memory or a hard disk drive (HDD), a drive device 100-6, and the like are connected to each other via an internal bus or a dedicated communication line. The communication controller 100-1 performs communication with constituent element other than the automated driving control device 100. The storage device 100-5 stores a program 100-5a that is executed by the CPU 100-2. The program is loaded on the RAM 100-3 by a direct memory access (DMA) controller (not shown) to be executed by the CPU 100-2. Thus, some or all of the first controller 120 and the second controller 160 are realized.

The above-described embodiment can be expressed as: a management device including a storage device that stores a program and a hardware processor, the hardware processor executing the program stored in the storage device to thereby perform: guiding a vehicle capable of performing automated traveling to a target parking space with reference to management information indicating parking situations of a plurality of parking spaces; receiving parking situation information which is information generated based on a recognition result by a recognizer recognizing a surrounding situation of the vehicle, the parking situation information indicating whether another vehicle is parked in a parking space adjacent to a route along which the vehicle is traveling; and extracting a parking space in which a parking situation managed with the management information is different from an actual parking situation based on the received parking situation information.

The embodiments for carrying out the present invention have been described above, but the present invention is not limited to the embodiments. Various modifications and substitutions can be made within the scope of the present invention without departing from the gist of the present invention.

For example, an aiming spot may be made in the parking lot PA and each vehicle may perform aiming within a range which can be formed by software of a vehicle. At the time of starting of parking, each vehicle may pass the aiming spot and perform aiming, and then may start parking. The aiming is, for example, a process of measuring and adjusting a direction of an optical axis of the exterior camera 10, the radar device 12, the finder 14, or the like. At the aiming spot, for example, a facility that performs the aiming may be set. The parking lot management device 400 communicates with a communication device installed in the aiming spot and acquires information indicating precision of externality detection performance of a vehicle passing through the aiming spot.

A vehicle side may extract the parking space PS in which a parking situation managed by the parking lot management device 400 is different from an actual parking situation and may transmit only parking situation information regarding the extracted parking space PS to the parking lot management device 400. For example, the automated driving control device 100 has a similar configuration to the extractor 424 included in the parking lot management device 400. The parking lot management device 400 may transmit all the pieces of information regarding the parking space state table 432 to the vehicle or may transmit only information regarding a full and vacant "state" of a parking space adjacent to a guiding route to the vehicle. For example, the parking lot management device 400 transmits information which is information indicating full and vacant "states" arranged in an alignment sequence of the parking spaces of the passage by the vehicle passes and is specifically information indicating "full, vacant, vacant, full, vacant, . . . " which is a parking situation of the parking space PS on the left side through which the vehicle passes to the vehicle.

The information generator 150 may generate the parking situation information based on a recognition result recognized by a recognizer of another vehicle which is being parked in the parking space PS. For example, the communication manager 152 transmits a request command to request a parked vehicle recognized by the parking situation recognizer 132 to transmit a recognition result. The parked vehicle generates parking situation information indicating that the parked vehicle is parked based on specific information of the parking space in which the vehicle is parked or generates parking situation information regarding the parking space PS of the surroundings.

The parked vehicle transmits the generated parking situation information to the parking lot management device 400 or the vehicle that has transmitted the request command. In the former case, the information generator 150 of the own vehicle M generates the parking situation information based on the recognition result received from the parked vehicle. In the latter case, the parking lot management device 400 updates the parking space state table 432 based on the parking situation information received from the own vehicle M and the parking situation information received from the parked vehicle. When the parking situation recognized by the own vehicle M does not match the parking situation recognized by the parked vehicle, the own vehicle M may generate the parking situation information based on the parking situation recognized by a vehicle with higher externality detection performance or the parking lot management device 400 may update the parking space state table 432 based on a parking situation recognized by the vehicle with the higher externality detection performance.

What is claimed is:

1. A management device that guides a vehicle capable of performing automated traveling to a target parking space with reference to management information indicating parking situations of a plurality of parking spaces, the management device comprising:
 a communicator configured to receive parking situation information which is information generated based on a recognition result by a recognizer recognizing a surrounding situation of the vehicle, the parking situation information indicating whether another vehicle is parked in a parking space adjacent to a route along which the vehicle is traveling; and
 an extractor configured to extract a parking space in which a parking situation managed with the management information is different from an actual parking situation based on the received parking situation information,
 wherein a vehicle with higher externality detection performance generates a guide route so that a distance to the target parking space becomes longer than that of a vehicle with lower externality detection performance.

2. The management device according to claim 1, wherein the parking situation information received by the management device is information indicating a parking situation of a parking space adjacent to the route along which the vehicle is traveling while the vehicle is traveling to the target parking space.

3. The management device according to claim 1, further comprising:
   a changer configured to change the management information regarding a parking situation of the parking space extracted by the extractor based on information received from the vehicle.

4. The management device according to claim 1, further comprising:
   an abnormality determiner configured to determine an abnormality based on an extraction result by the extractor.

5. A vehicle management method, by way of a computer, including:
   guiding a vehicle capable of performing automated traveling to a target parking space with reference to management information indicating parking situations of a plurality of parking spaces;
   receiving parking situation information which is information generated based on a recognition result by a recognizer recognizing a surrounding situation of the vehicle, the parking situation information indicating whether another vehicle is parked in a parking space adjacent to a route along which the vehicle is traveling; and
   extracting a parking space in which a parking situation managed with the management information is different from an actual parking situation based on the received parking situation information,
   wherein a vehicle with higher externality detection performance generates a guide route so that a distance to the target parking space becomes longer than that of a vehicle with lower externality detection performance.

6. A non-transitory computer-readable recording medium that includes a program causing a computer to:
   guide a vehicle capable of performing automated traveling to a target parking space with reference to management information indicating parking situations of a plurality of parking spaces;
   receive parking situation information which is information generated based on a recognition result by a recognizer recognizing a surrounding situation of the vehicle, the parking situation information indicating whether another vehicle is parked in a parking space adjacent to a route along which the vehicle is traveling; and
   extract a parking space in which a parking situation managed with the management information is different from an actual parking situation based on the received parking situation information,
   wherein a vehicle with higher externality detection performance generates a guide route so that a distance to the target parking space becomes longer than that of a vehicle with lower externality detection performance.

7. A vehicle management system comprising:
   a management device configured to guide a vehicle capable of performing automated traveling to a target parking space with reference to management information indicating parking situations of a plurality of parking spaces; and
   a vehicle control device mounted in the vehicle and including a communicator that communicates with the management device and a recognizer that recognizes a surrounding situation of the vehicle,
   wherein the vehicle control device further includes a generator that generates parking situation information including information indicating whether another vehicle is parked in a parking space that the vehicle passes based on a result recognized by the recognizer and causes the communicator to transmit the parking situation information to the management device,
   wherein the management device further includes an extractor that extracts a parking space in which a parking situation managed with the management information is different from an actual parking situation based on the parking situation information received from the vehicle control device, and
   wherein a vehicle with higher externality detection performance generates a guide route so that a distance to the target parking space becomes longer than that of a vehicle with lower externality detection performance.

* * * * *